(12) United States Patent
Luo

(10) Patent No.: US 12,138,970 B1
(45) Date of Patent: Nov. 12, 2024

(54) WIRELESS VEHICLE MONITORING SYSTEM AND DEVICE WITH INTEGRATED TIRE PRESSURE MONITORING

(71) Applicant: Shenzhen Baoshijie Technology Co., Ltd., Shenzhen (CN)

(72) Inventor: Mingcai Luo, Shenzhen (CN)

( * ) Notice: Subject to any disclaimer, the term of this patent is extended or adjusted under 35 U.S.C. 154(b) by 0 days.

(21) Appl. No.: 18/431,486

(22) Filed: Feb. 2, 2024

(30) Foreign Application Priority Data

Jan. 22, 2024 (CN) .......................... 202420148050.3

(51) Int. Cl.
*B60C 23/04* (2006.01)
*G07C 5/08* (2006.01)
*G08B 21/18* (2006.01)

(52) U.S. Cl.
CPC ...... *B60C 23/0479* (2013.01); *B60C 23/0401* (2013.01); *G07C 5/0825* (2013.01); *G08B 21/182* (2013.01)

(58) Field of Classification Search
CPC ............ B60C 23/0479; B60C 23/0401; G07C 5/0825; G08B 21/182
USPC .......................................................... 340/447
See application file for complete search history.

(56) References Cited

U.S. PATENT DOCUMENTS

| | | | | |
|---|---|---|---|---|
| 6,535,116 B1* | 3/2003 | Zhou | .................... | B60C 23/0408 340/447 |
| 8,768,569 B2* | 7/2014 | Kim | ..................... | G08G 1/0962 340/670 |
| 10,207,716 B2* | 2/2019 | Liu | .................... | B60K 35/00 |
| 10,230,829 B2* | 3/2019 | Pelly | ............... | H04M 1/724098 |
| 2009/0096597 A1* | 4/2009 | Avery, Jr. | ............. | G08G 1/0962 340/459 |
| 2010/0060531 A1* | 3/2010 | Rappaport | ............. | H01Q 1/243 455/39 |
| 2013/0241720 A1* | 9/2013 | Ricci | ..................... | G06F 3/0486 715/765 |
| 2015/0012170 A1* | 1/2015 | Pita-Gil | .............. | B60C 23/0479 701/31.5 |
| 2017/0075522 A1* | 3/2017 | Kim | ....................... | B60K 35/10 |
| 2018/0178601 A1* | 6/2018 | Surendra | .............. | G07C 5/0816 |
| 2019/0009786 A1* | 1/2019 | Liu | ........................ | B60C 23/02 |

* cited by examiner

*Primary Examiner* — Eric Blount

(57) ABSTRACT

The present disclosure provides a vehicle-mounted monitoring device and a vehicle-mounted monitoring system. The vehicle-mounted monitoring device includes a main body detachably arranged on a vehicle, and the main body is arranged with a circuit board, a display screen, a first communication module and a second communication module, and the display screen, the first communication module and the second communication module are all electrically connected to the circuit board. The first communication module is configured to receive image data wirelessly transmitted from at least one camera and then transmit the image data to the circuit board, the second communication module is configured to receive tire pressure data wirelessly transmitted from at least one tire pressure sensor and then transmit the tire pressure data to the circuit board, and the circuit board transmits both the image data and tire pressure data to the display screen for display.

18 Claims, 17 Drawing Sheets

WIRELESS VEHICLE MONITORING SYSTEM AND DEVICE WITH INTEGRATED TIRE PRESSURE MONITORING

CROSS-REFERENCE TO RELATED APPLICATIONS

The application claims priority of Chinese patent application CN202420148050.3, filed on Jan. 22, 2024, which is incorporated herein by reference in its entireties.

TECHNICAL FIELD

The present disclosure relates to the technical field of vehicle-mounted monitoring, particularly to a vehicle-mounted monitoring device and system.

BACKGROUND

Current existing tire pressure monitors generally include a tire pressure monitoring device with a small display screen placed on a console in the car and a tire pressure sensors installed on tires. The tire pressure sensors wirelessly connect to the tire pressure monitor, enabling the transmission of detected tire pressure data to a display screen for user monitoring. Additionally, for convenient monitoring of vehicle's surroundings, multiple cameras are typically installed around the vehicle, and a monitoring host with a display screen is provided inside the vehicle, the monitoring host receives image data collected by cameras and displays the image data on the screen. Consequently, multiple display screens are placed in the vehicle, occupying space and potentially affecting driving safety as the driver must view corresponding information on different devices.

SUMMARY

The primary objective of the present disclosure is to provide a vehicle-mounted monitoring device and system to address the issue of safety impact due to multiple display screens caused by separate operation of existing tire pressure monitors and image monitoring systems.

In order to solve the technical problem, the technical scheme provided by the present disclosure is as follows.

In the first aspect, the present disclosure provides a vehicle-mounted monitoring device, including a detachable main body arranged on a vehicle, and the main body is arranged with a circuit board, a display screen, a first communication module and a second communication module, and the display screen, the first communication module and the second communication module are all electrically connected to the circuit board; the first communication module is configured to receive image data wirelessly transmitted from at least one camera and then transmit the image data to the circuit board, the second communication module is configured to receive tire pressure data wirelessly transmitted from at least one tire pressure sensor and then transmit the tire pressure data to the circuit board, and the circuit board transmits both the image data and tire pressure data to the display screen for display.

Further, the first communication module is a 2.4G module and the second communication module is a 433m wireless module.

Further, the first communication module includes a first antenna electrically connected to the circuit board, and the first antenna is disposed on a top of the main body; the second communication module includes a second antenna electrically connected to the circuit board, the second antenna being either an FPC antenna or a spring antenna.

Further, when the second antenna is the FPC antenna, at least part of the second antenna is adhered to a top or near a top of an inner side wall of the main body.

Further, the tire pressure data includes one or more of the following: tire pressure, tire temperature, and battery power information of the tire pressure sensor.

Further, the circuit board drives the display screen to show an alarm indication when the tire pressure data is abnormal, the abnormality in the tire pressure data being one or more of the following: tire pressure higher than a first preset value, tire temperature higher than a preset temperature, tire pressure lower than a second preset value.

Further, a tire pressure alarm indication includes one or more of the following: a tire pressure alarm icon, a real-time tire imagery, and an abnormal tire virtual imagery, the real-time tire imagery is the real-time image of the abnormal tire captured by the camera, and the abnormal tire virtual imagery includes virtual image data pre-stored in the circuit board; the virtual image data includes dynamic imagery data for excessively high tire pressure, excessively low tire pressure, and tire turning red, or a combination thereof.

Further, the circuit board drives the display screen to show a reminder indication when a battery power transmitted by the tire pressure sensor is below a preset power level.

Further, further includes an alarm unit arranged in the main body and electrically connected to the circuit board, the circuit board driving the alarm unit to alert when the tire pressure data is abnormal; the alarm unit being one or more of a horn, a buzzer, or an alarm light.

Further, the alarm unit is a horn, and the circuit board drives the horn to emit a tire blowout sound and drives the display screen to show a blowout image or a blowout indicator when the tire pressure changes from a normal pressure value to below a third preset value within a preset time period, the blowout image is either the real-time image of the tire captured by the camera or a virtual dynamic image of the blowout.

Further, the display screen is a touch screen, the touch screen is configured to respond to user's touch commands for a target task to display a control result of the target task, the control results includes one of a tire pressure management menu, switching images captured by multiple cameras, switching preset data of multiple tire pressure sensors, or adjusting tire pressure anomaly alarm values, and the tire pressure anomaly alarm values include a high-pressure alarm value and a low-pressure alarm value, and the tire pressure management menu at least includes tire pressure data.

Further, the tire pressure management menu further includes a pairing unit; the touch screen pairs with a tire pressure sensor set on a tire valve based on user touch control of the pairing unit, thereby enabling the circuit board to pair with the tire pressure sensor through the second antenna.

Further, the touch screen also achieves pairing between the circuit board and the tire pressure sensor through the second antenna after the user touches the pairing unit and inputs a tire pressure sensor ID.

Further, the tire pressure management menu also includes a deletion unit, the touch screen clears a paired tire pressure sensor ID with the circuit board after the user touches the deletion unit; the tire pressure management menu also includes a reset unit, the touch screen clears all tire pressure sensor IDs paired with the circuit board after the user touches the reset unit.

In another aspect, the present disclosure also provides a vehicle-mounted monitoring system, wherein it includes: at least one monitoring component, and the vehicle-mounted monitoring device described above; each monitoring component is configured to in conjunction with a vehicle, and each monitoring component includes: the camera wirelessly connected to the first communication module and configured for monitoring, and the tire pressure sensor wirelessly connected to the second communication module and configured for collecting tire pressure data.

The first communication module receives image data wirelessly transmitted from the camera and transmits the image data to the circuit board. The second communication module receives tire pressure data wirelessly transmitted from the tire pressure sensor and transmits the tire pressure data to the circuit board, the circuit board then transmits both the image data and the tire pressure data to the display screen for display.

Further, the tire pressure management menu also includes multiple tire pressure monitoring units, each tire pressure monitoring unit corresponding to the tire pressure sensor in a set of monitoring components, the touch screen displays tire pressure data of the corresponding monitoring component after the user touches the trailer tire pressure monitoring unit.

Further, it also includes a repeater, the repeater is configured to transmit the received tire pressure data to the vehicle-mounted monitoring device.

Further, it also includes a vehicle mount, a bottom of the vehicle mount is fixed on a vehicle's central control console by a suction cup or adhesive; a back of the vehicle-mounted monitoring device is provided with a groove, the vehicle mount is provided with a slider, and the vehicle-mounted monitoring device is fixed on the vehicle mount through the slider placed in the groove.

Further, the vehicle mount includes a suction cup base, a first rotating rod rotatably arranged on the suction cup base, and a second rotating rod rotatably connected to the first rotating rod through a universal ball joint, the slider is arranged at an end of the second rotating rod far from the first rotating rod.

Further, it further includes a cigarette lighter configured to adapt to a vehicle's cigarette lighter socket and a first connection cable electrically connected to the cigarette lighter, the first connection cable is provided with a male power plug at an end far from the cigarette lighter, the main body is provided with a female power plug electrically connected to the circuit board and configured to mate with the male power plug, the cigarette lighter draws power from the vehicle's cigarette lighter socket and transmits the power to the circuit board and display screen through the first connection cable.

The present disclosure has the following beneficial effects. Compared with the prior art, In the present disclosure, by providing the first communication module and the second communication module in the vehicle-mounted monitoring device to receive image signals transmitted from the camera and tire pressure data transmitted from the tire pressure sensor, to achieve reduction of excessive issues with the display screen, thereby simplifying the vehicle interior, improving the driver's field of vision, obviating the necessity of monitoring multiple display screens, enhancing driving focus, and increasing road safety.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

DETAILED DESCRIPTION OF THE EMBODIMENTS

Figure 1:
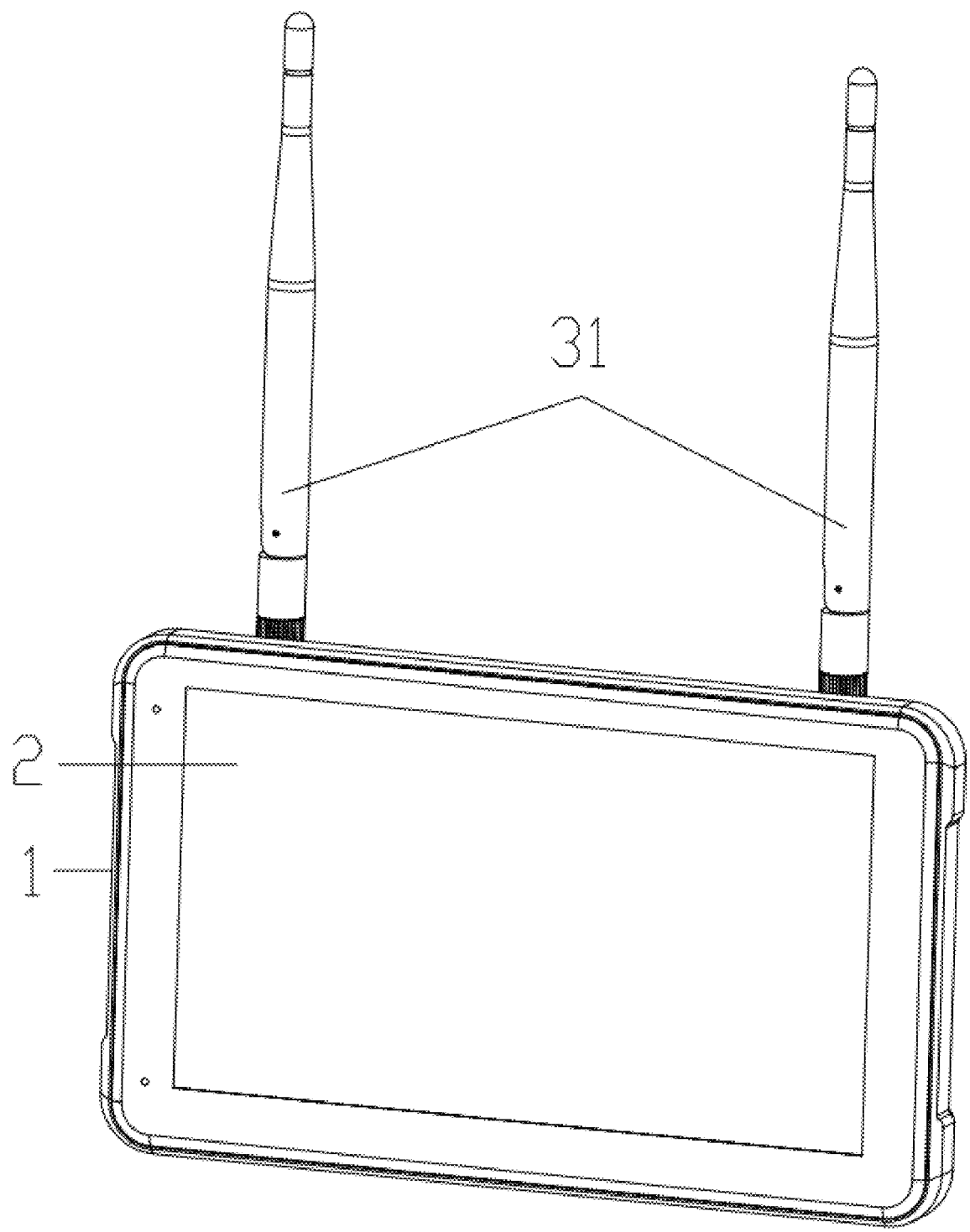
FIG. 1 is a three-dimensional view of a vehicle-mounted monitoring device of the present disclosure.
Figure 2:
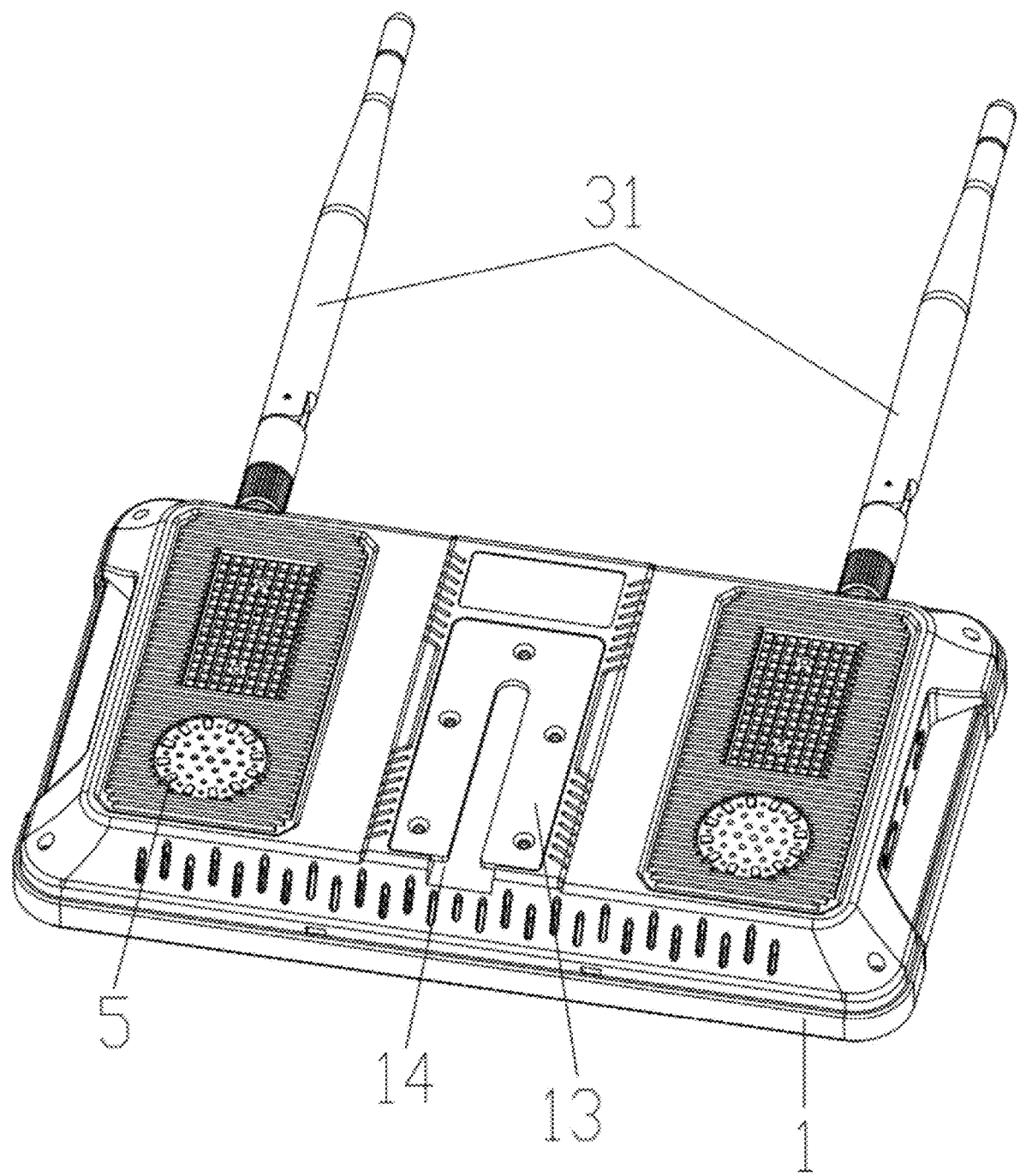
FIG. 2 is a three-dimensional view of the vehicle-mounted monitoring device of the present disclosure from another perspective.
Figure 3:
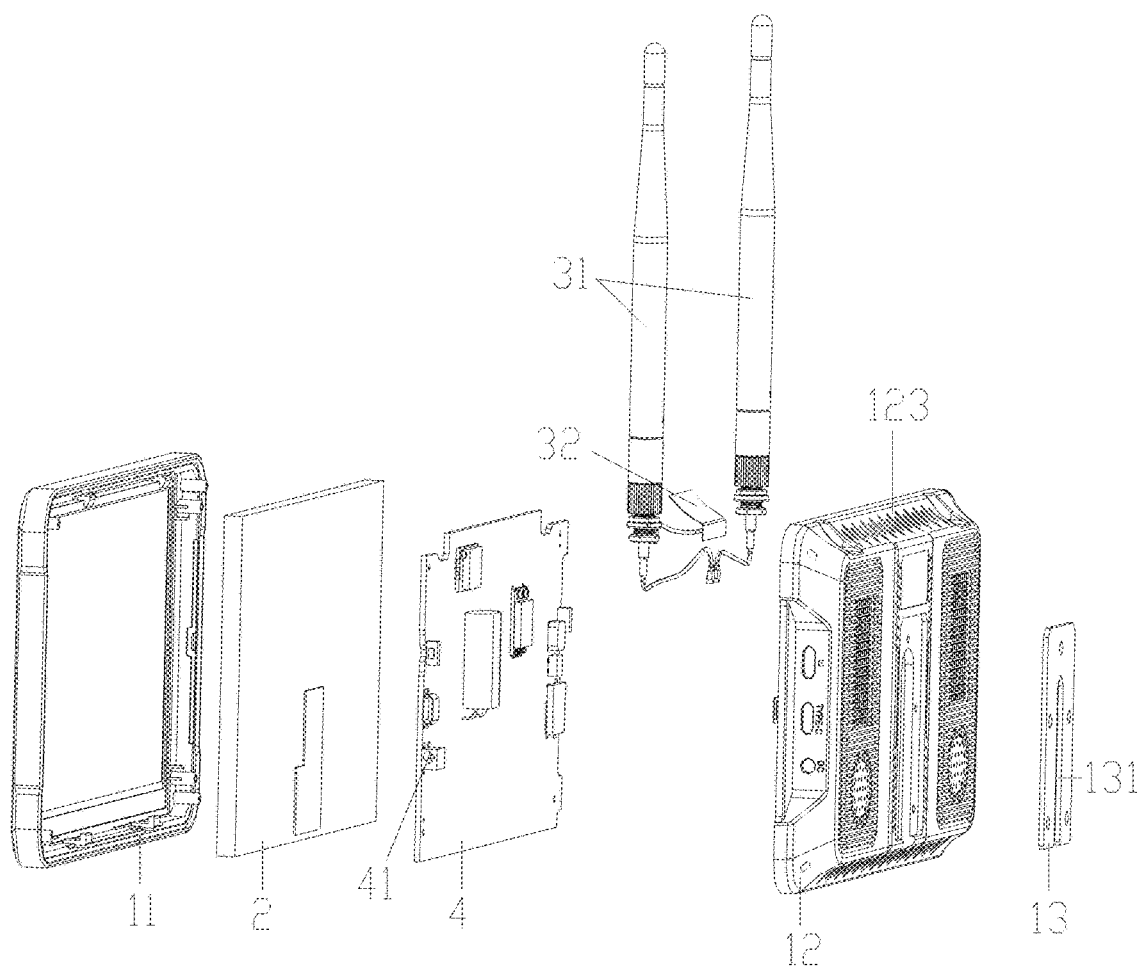
FIG. 3 is an exploded view of the vehicle-mounted monitoring device.
Figure 4:
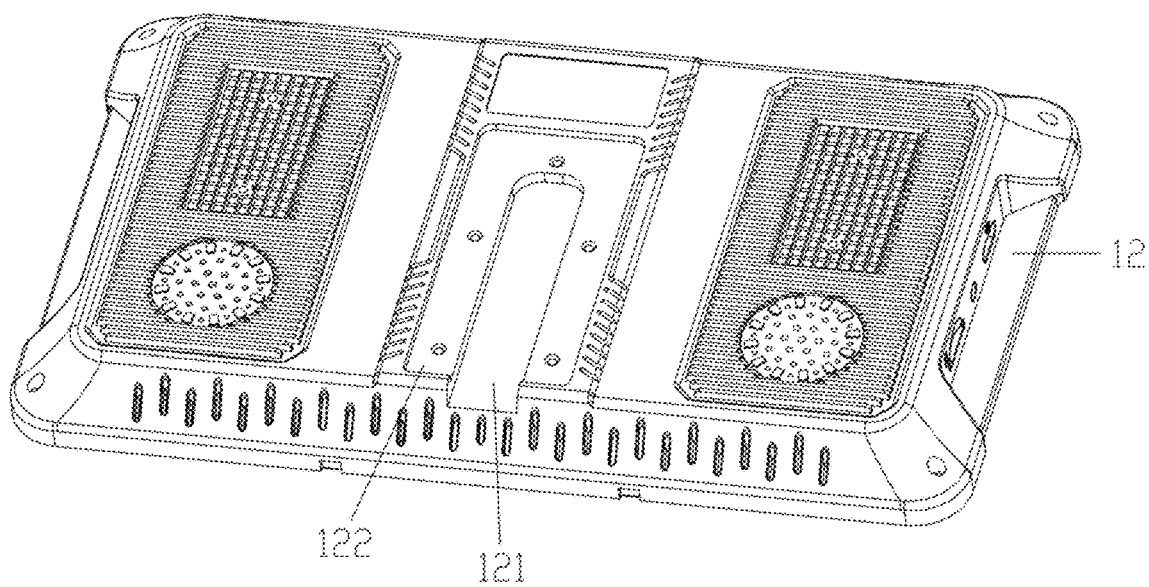
FIG. 4 is a structure view of a rear shell of the vehicle-mounted monitoring device.
Figure 5:
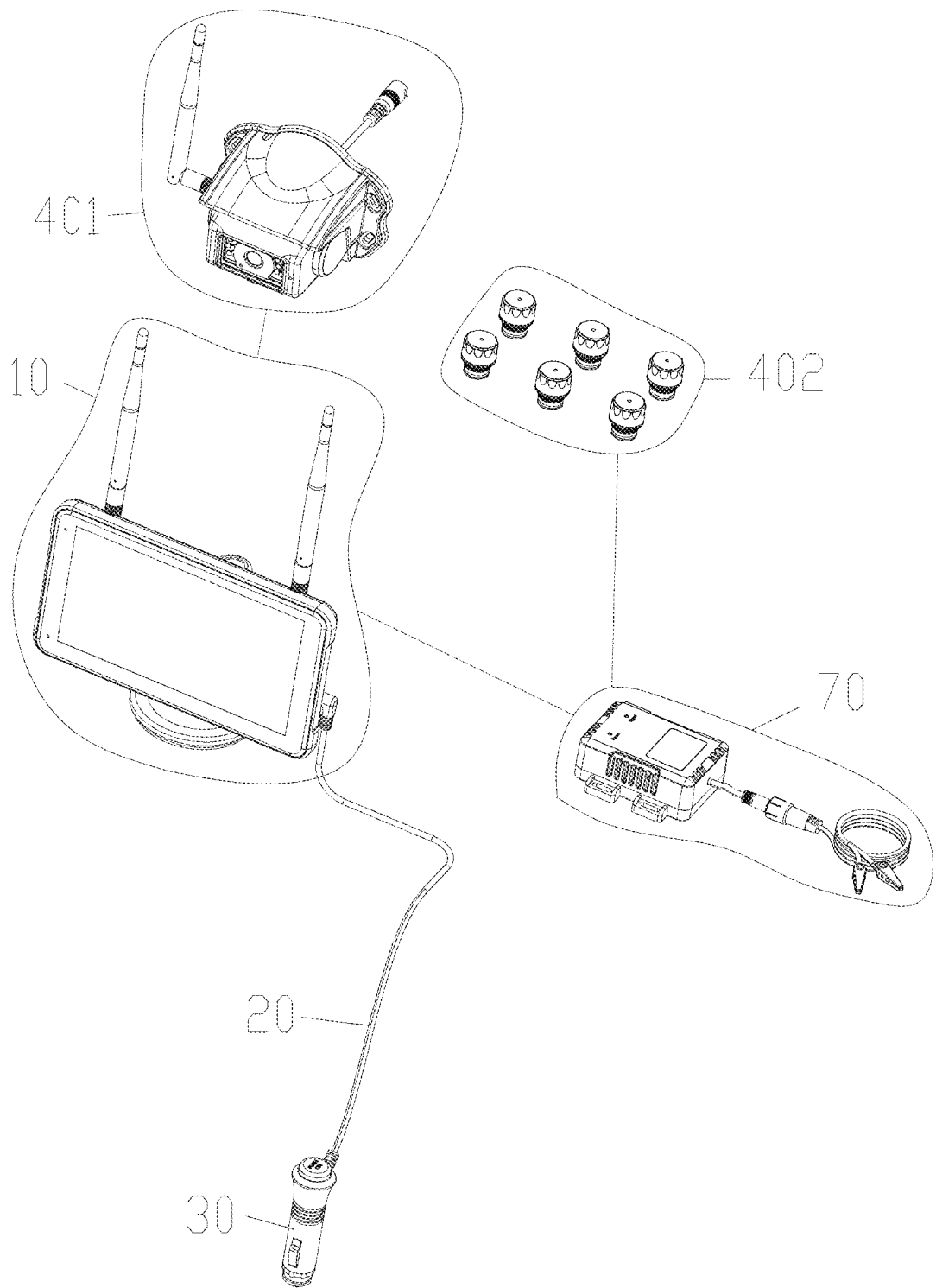
FIG. 5 is a photograph view of the vehicle-mounted monitoring system of the present disclosure.

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

Referring to FIG. 1-4, an embodiment of a vehicle-mounted monitoring device 10 in the present disclosure is presented.

A vehicle-mounted monitoring device 10 includes a detachable main body 1 arranged in the vehicle. The main body 1 is arranged with a circuit board 4, a display screen 2, a first communication module 100, and a second communication module 200. The display screen 2, the first communication module 100, and the second communication module 200 are electrically connected to the circuit board 4. The first communication module 100 is configured to receive image data wirelessly transmitted from at least one camera 401 and to transmit the image data to the circuit board 4. The second communication module 200 is also configured to receive tire pressure data 505 wirelessly transmitted from at least one tire pressure sensor 402 and to transmit the tire pressure data 505 to the circuit board 4, the circuit board 4 then transmits both the image data and the tire pressure data 505 to the display screen 2 for display.

In this embodiment, by providing the first communication module 100 and the second communication module 200 in the vehicle-mounted monitoring device 10 to receive image signals transmitted from the camera 401 and tire pressure data 505 transmitted from the tire pressure sensor 402, to achieve reduction of excessive issues with the display screen 2, thereby simplifying the vehicle interior, improving the driver's field of vision, obviating the necessity of monitoring multiple display screens, enhancing driving focus, and increasing road safety.

Specifically, the first communication module 100 includes a first antenna 31 electrically connected to the circuit board 4, and the second communication module 200 includes a second antenna 32 also electrically connected to the circuit board 4. The first antenna 31 is configured to receive image data wirelessly transmitted from at least one camera 401 and transmit the image data to the circuit board 4. The second antenna 32 is configured to receive tire pressure data 505 wirelessly transmitted from at least one tire pressure sensor 402 and transmit the tire pressure data to the circuit board 4, enabling the vehicle-mounted monitoring device 10 to wirelessly receive both image data and tire pressure data 505. Wherein the first communication module 100 is a 2.4G module, and the first antenna 31 is a 2.4G antenna and arranged at a top of the main body 1 for better reception of wireless image data.

In one embodiment, the first antenna 31 is configured to receive high-definition video data, specifically 1080P frequency video data, for convenient monitoring by the user. The second antenna 32 can be an FPC antenna or a spring antenna. The second communication module 200 is a 433m wireless module, meaning a transmission frequency of the second antenna 32 is 433 MHz, matching transmission frequency of the tire pressure sensor 402 for receiving tire pressure data 505.

Specifically, when the second antenna 32 is an FPC antenna, at least part of the second antenna adheres to a top or near a top of an inner side wall of the main body 1, to enhance the strength of wireless signal from the tire pressure sensor 402.

In the above embodiment, the main body 1 includes a front shell 11 and a rear shell 12 connected to the front shell 11 to form a cavity. The display screen 2 is arranged on the front shell 11, the circuit board 4 is placed inside the cavity and fixed to the rear shell 12 by screws. The first antenna 31 includes two antennas arranged at intervals at a top of the rear shell 12 and each connected to the circuit board 4 through a coaxial line. A top surface of the rear shell 12 is provided with an arc surface 123, at least part of the second antenna 32 adhering to the arc surface 123, and the second antenna 32 is connected to the circuit board 4 through a coaxial line.

In one embodiment, the tire pressure data 505 includes tire pressure, tire temperature, and battery power information of the tire pressure sensor 402, or a combination thereof, allowing users to understand tire pressure, temperature, and battery level of the sensor 402 through the display screen 2.

In one embodiment, the circuit board 4 drives the display screen 2 to show an alarm indication when the tire pressure data 505 is abnormal. An anomaly in tire pressure data 505 includes tire pressure higher than a first preset value, tire temperature higher than a preset temperature, or tire pressure lower than a second preset value, or a combination thereof. The first preset value, the preset temperature, the second preset value can be customized by the user or set by default at the factory, enabling to alert the user in case of tire pressure anomalies, preventing accidents and enhancing road safety.

In one embodiment, the tire pressure alarm indication includes a tire pressure alarm icon, real-time tire imagery, and abnormal tire virtual imagery, or a combination thereof. The real-time tire imagery is the real-time images of abnormal tires captured by the camera 401, while the abnormal tire virtual imagery is the virtual image data pre-stored in the circuit board 4. The virtual image data include dynamic image data of excessively high tire pressure, excessively low tire pressure, or tires turning red, or a combination thereof. Using image display allows users to intuitively understand the condition of tires, and enables drivers to better judge whether it is safe to pull over for inspection, thereby enhancing driving safety and user convenience.

In one embodiment, the circuit board 4 drives the display screen 2 to show a reminder indication when the battery level transmitted by the tire pressure sensor 402 falls below a preset level, enabling the user to timely replace the tire pressure sensor 402, change the battery, or recharge, etc.

In one embodiment, the vehicle-mounted monitoring device 10 also includes an alarm unit 5 arranged within the main body 1 and electrically connected to the circuit board 4, the circuit board 4 drives the alarm unit 5 to sound an alert when the tire pressure data 505 is abnormal. The alarm unit 5 can be a horn, a buzzer, an alarm light, or a combination thereof. Thus the device can provide visual and auditory alerts, such as sounds, lights, or a combination of both when the tire pressure data 505 is abnormal, allowing users to intuitively understand tire abnormalities and enhancing the user experience.

Specifically, the alarm unit 5 is the horn, and the tire pressure changes from a normal pressure value to below a third preset value within a preset time period, the circuit board 4 drives the horn to emit a tire blowout sound and the display screen 2 to show a blowout image or blowout indicator. The blowout image could be the real-time image of the tire captured by the camera 401 or a virtual dynamic image of the blowout.

In one embodiment, the display screen 2 is a touch screen, the touch screen is configured to respond to user touch control commands for a specific task and to display the control results of the task. The control results include a tire pressure management menu, switching among images captured by multiple cameras 401, switching preset data of multiple tire pressure sensors 402, and adjusting abnormal tire pressure alarm values. The abnormal tire pressure alarm values include high-pressure alarm values and low-pressure alarm values. The tire pressure management menu at least includes tire pressure data 505, enabling users to switch between different camera 401 views, view tire pressure data 505, and adjust abnormal tire pressure alarm values through the touch screen.

Figure 24:
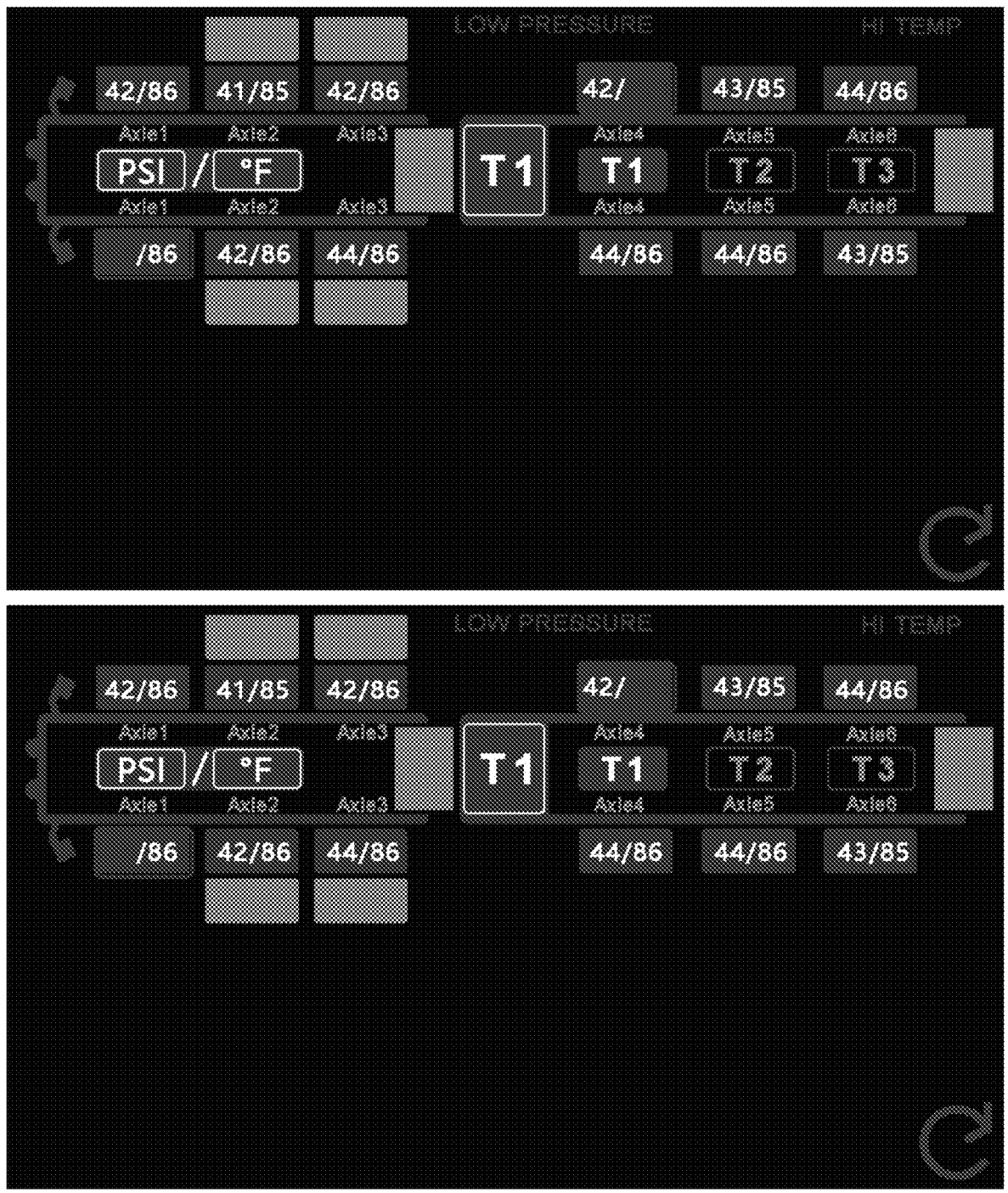
FIG. 24 is a schematic diagram of the display screen of the vehicle-mounted monitoring device in a tire pressure management menu state.
Figure 26:
FIG. 26 is a schematic diagram of the display screen of the vehicle-mounted monitoring device in a state of tire pressure anomaly.

Specifically, in this embodiment, when the tire pressure data 505 is abnormal, the user can enter the tire pressure management menu by touching the tire pressure alarm icon on the touch screen 2. In the interface, data indicating an abnormality is prominently displayed in red, along with a red text description of the abnormal tire pressure, allowing users to easily view the abnormal tire pressure data 505, as shown in FIG. 24 and FIG. 26, the tire pressure alarm icon is represented by an exclamation mark as shown in FIG. 24 and text at top in FIG. 26.

Figure 10:
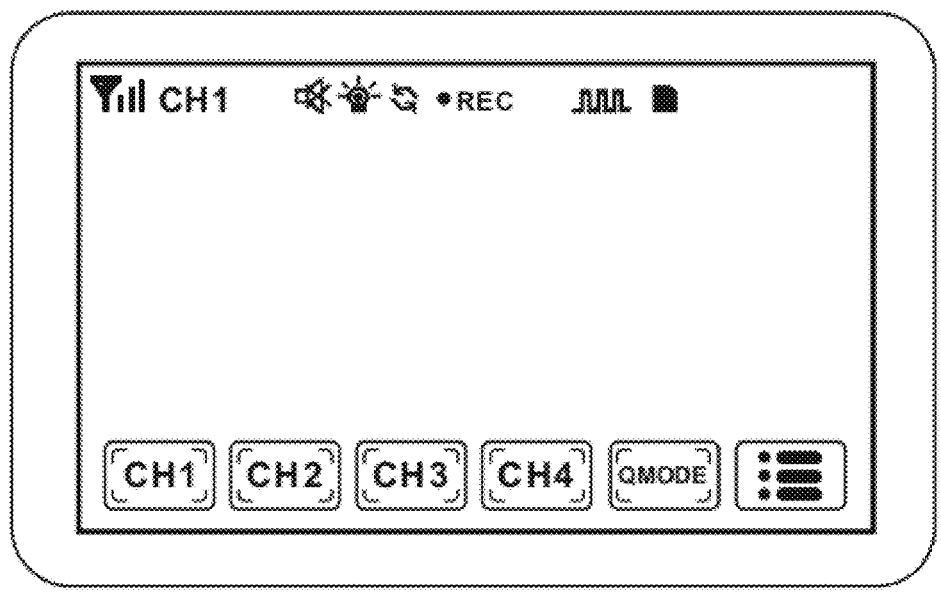
FIG. 10 is a schematic diagram of a display screen of the vehicle-mounted monitoring device in a first set of shortcut menu states.

When the vehicle-mounted monitoring device 10 is in initial state, the display screen 2 shows image captured by one of the cameras 401. By tapping the display screen 2, a first group of shortcut menus pops up, as shown in FIG. 10. The first group of shortcut menus includes multiple camera 401 switching channels, a mode menu QMODE, and a main menu identifier.

Figure 12:
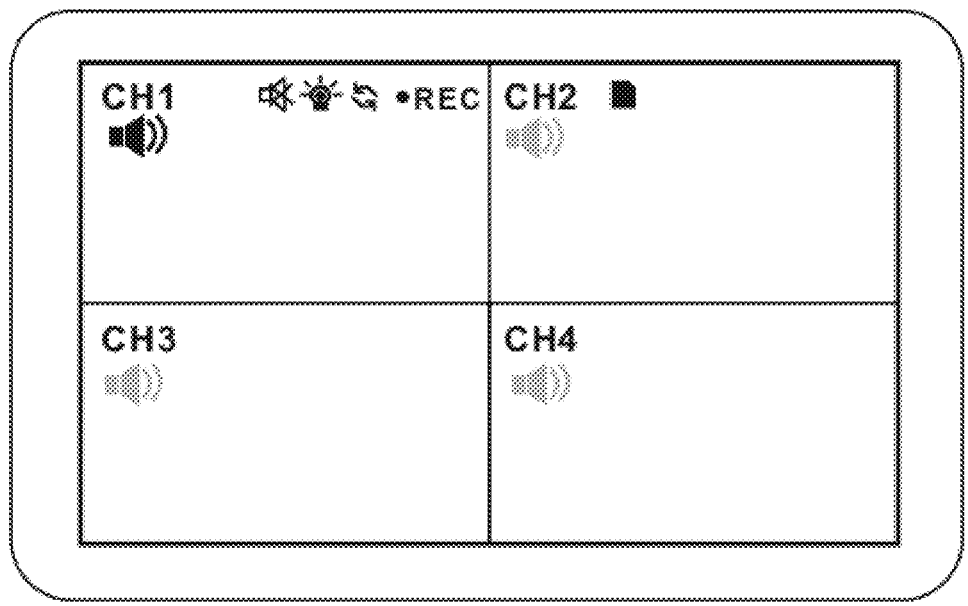
FIG. 12 is a schematic diagram of the display screen of the vehicle-mounted monitoring device entering a mode menu QMODE state.
Figure 13:
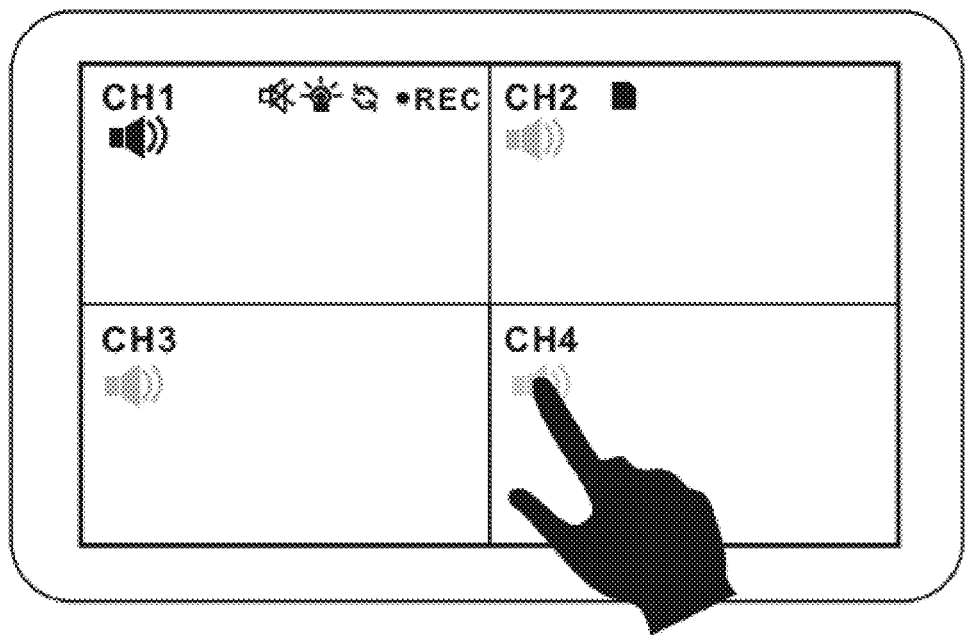
FIG. 13 is a schematic diagram of a user operating the display screen in the mode menu QMODE state of the vehicle-mounted monitoring device.
Figure 14:
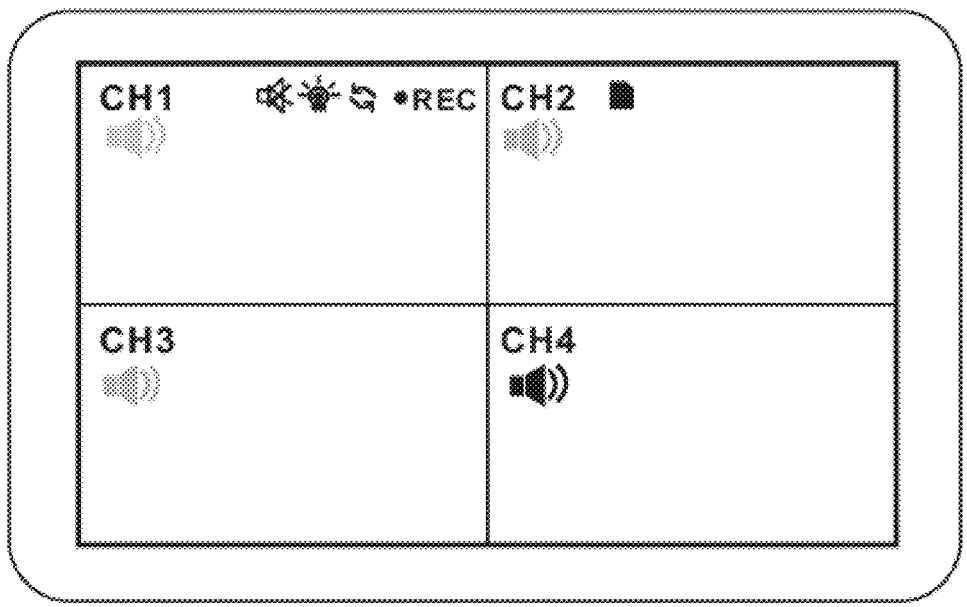
FIG. 14 is a schematic diagram of the display screen of the vehicle-mounted monitoring device entering the mode menu QMODE state.
Figure 15:
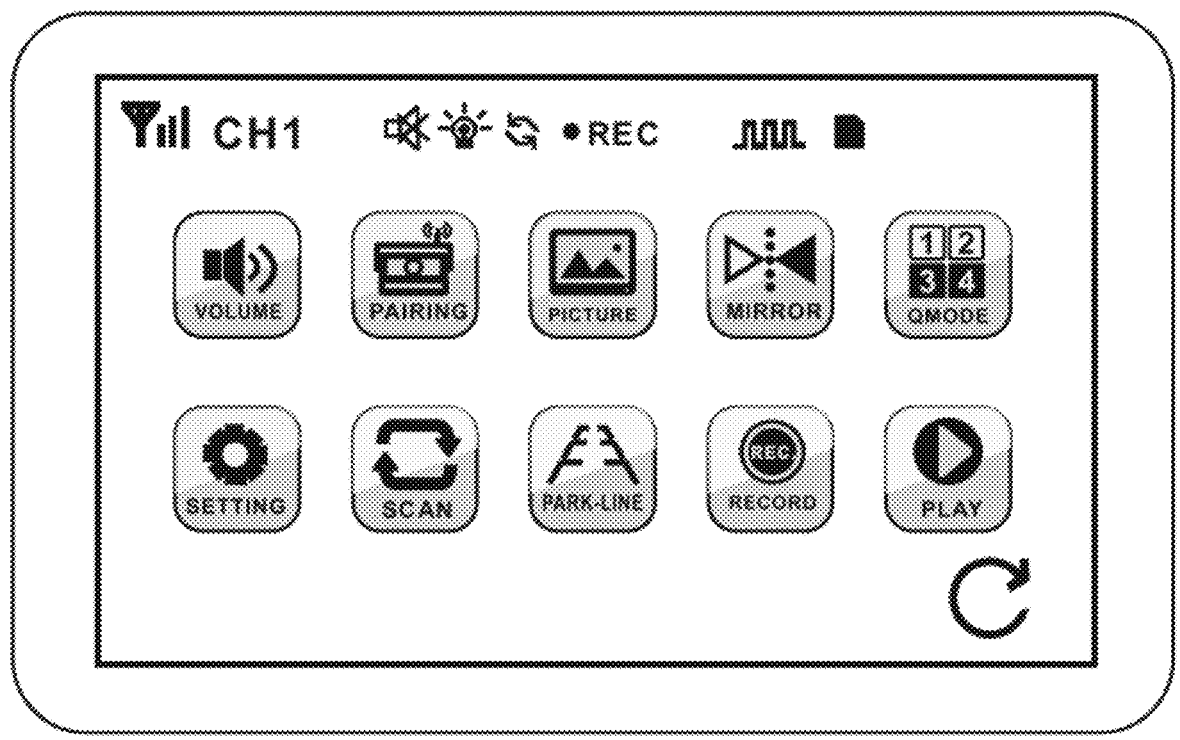
FIG. 15 is a schematic diagram of the display screen of the vehicle-mounted monitoring device in a main menu function state.

For example, if there are four cameras 401, the switching channels would be CH1, CH2, CH3, and CH4. When the user taps the mode menu QMODE, the display screen 2 shows all images from cameras 401, as shown in FIG. 12-FIG. 14. Tapping a sound icon allows the user to turn on or off sound captured by the camera 401. When taps a rightmost main menu list, the user enters main menu functions, as shown in FIG. 15. The main menu functions include two rows: the first row from left to right includes sound settings for adjusting camera volume, a pairing unit for camera pairing, a PICTURE unit, a MIRROR unit, and the mode menu QMODE; the second row from left to right includes a SETTING icon, a SCAN icon, a parking line switch menu, a RECORD icon, and a PLAY icon.

Figure 16:
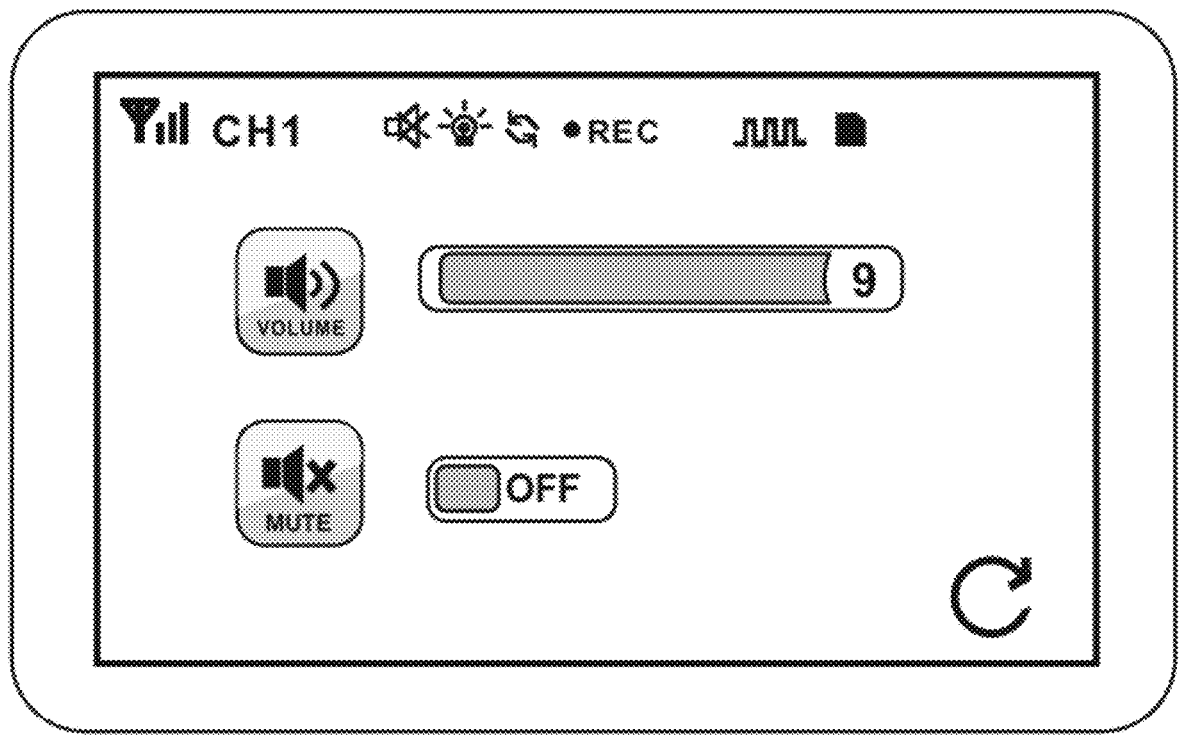
FIG. 16 is a schematic diagram of the display screen of the vehicle-mounted monitoring device entering a sound setting state.
Figure 17:
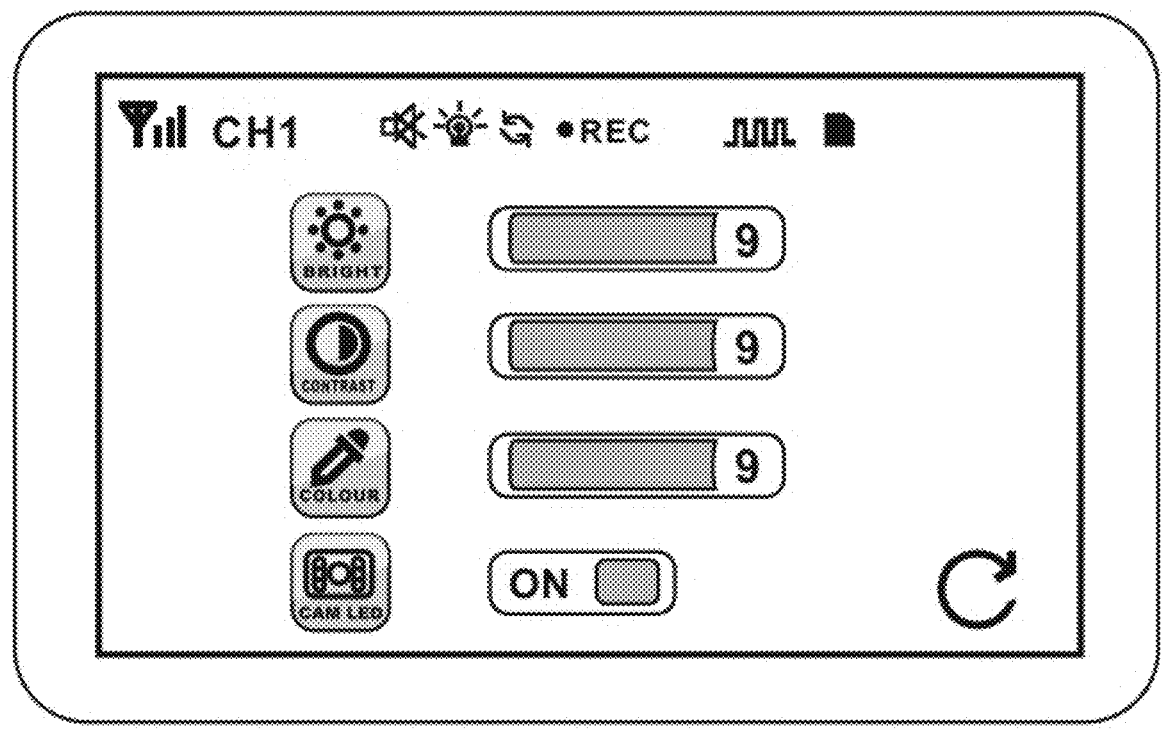
FIG. 17 is a schematic diagram of the display screen of the vehicle-mounted monitoring device entering a PICTURE unit state.
Figure 18:
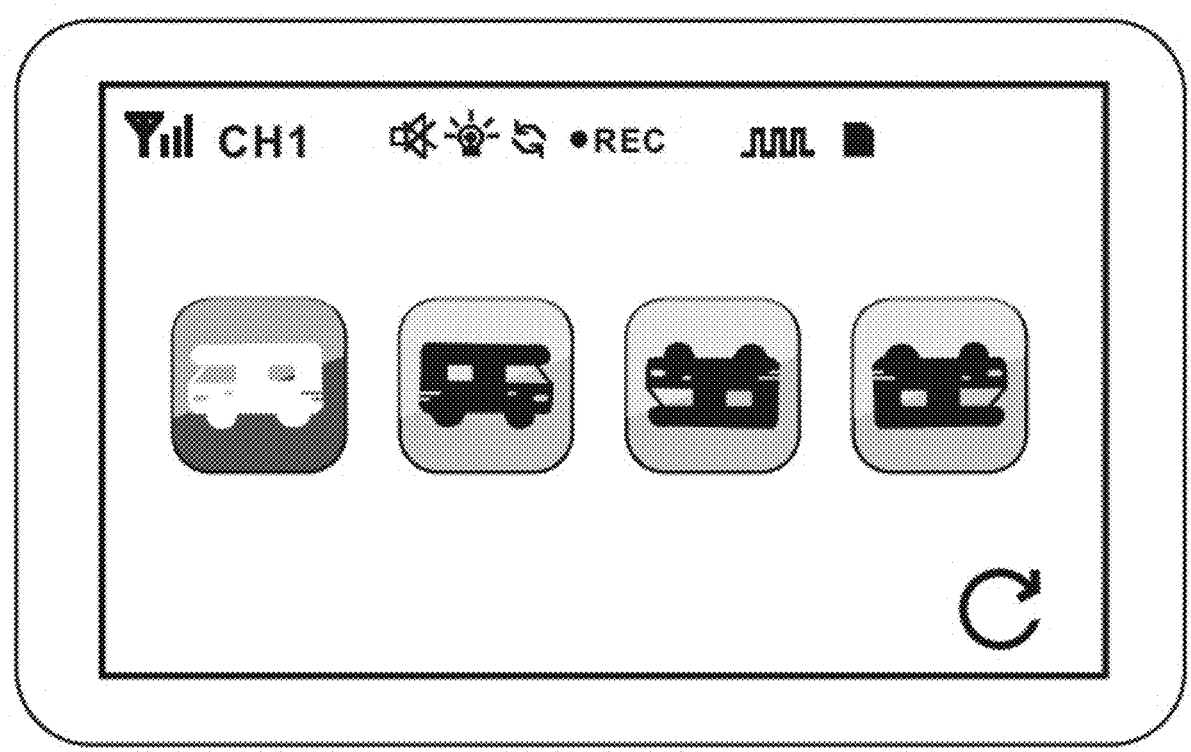
FIG. 18 is a schematic diagram of the display screen of the vehicle-mounted monitoring device entering a MIRROR unit state.
Figure 19:
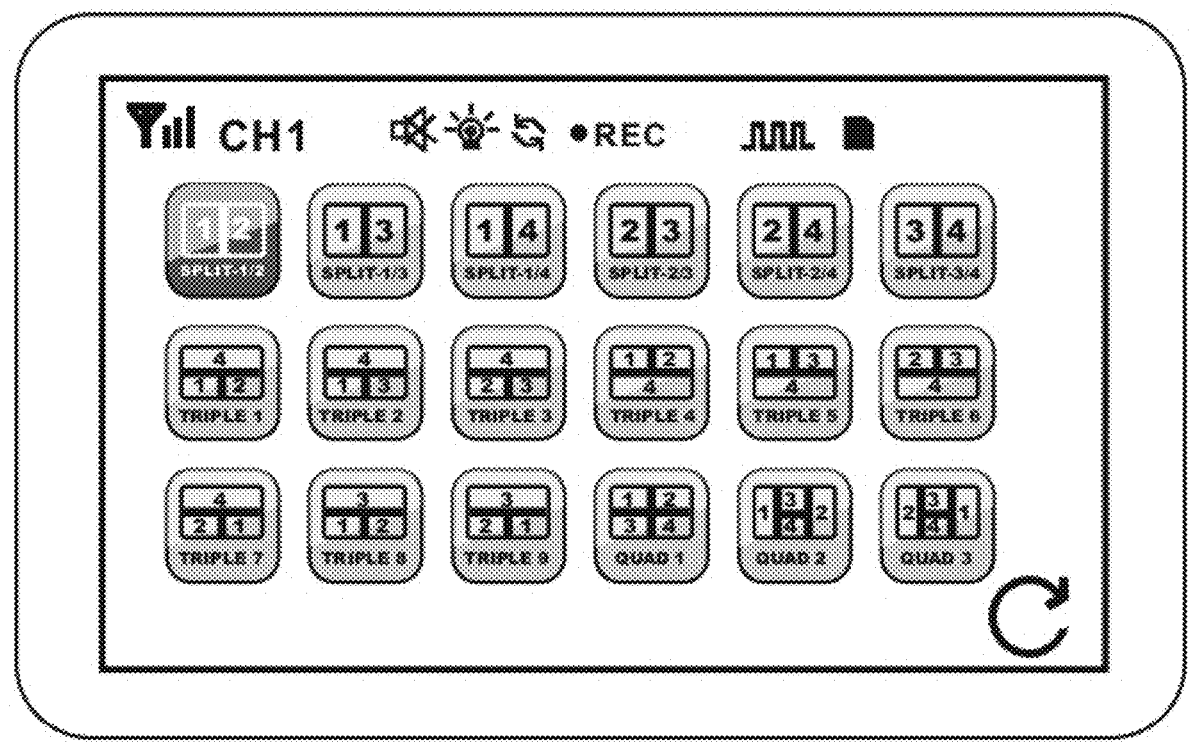
FIG. 19 is a schematic diagram of the display screen of the vehicle-mounted monitoring device entering a SETTING icon state.
Figure 20:
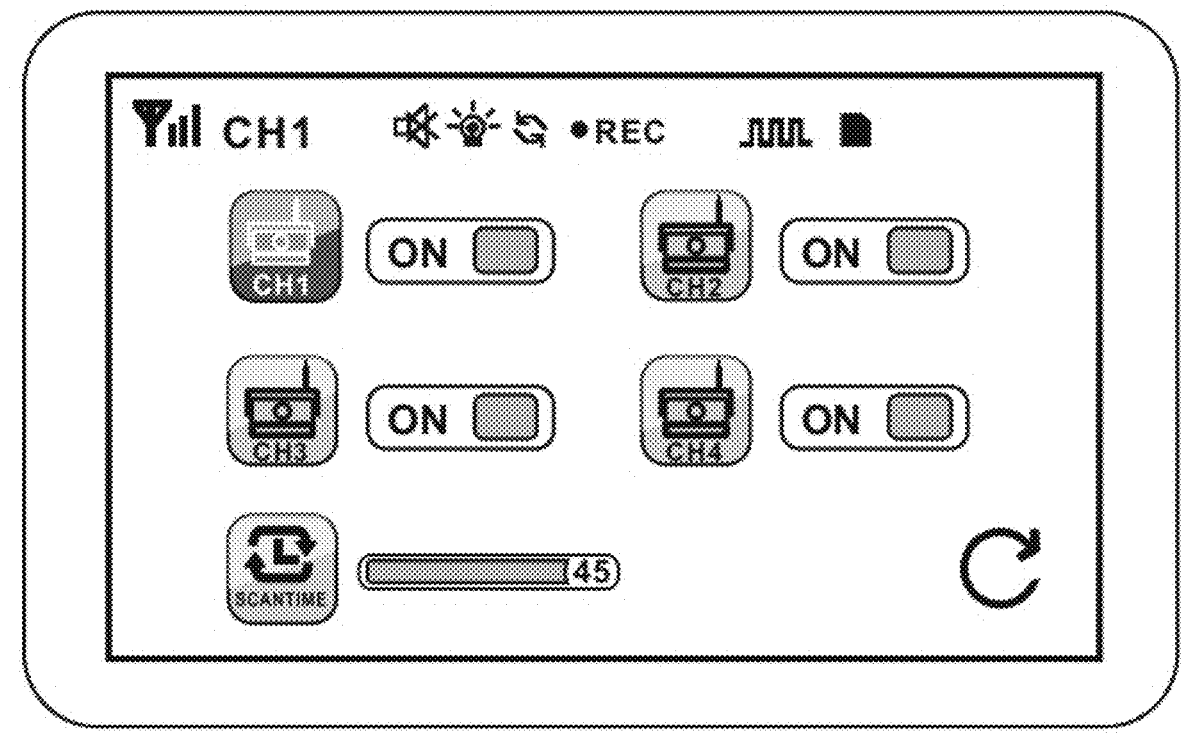
FIG. 20 is a schematic diagram of the display screen of the vehicle-mounted monitoring device entering a SCAN icon state.
Figure 21:
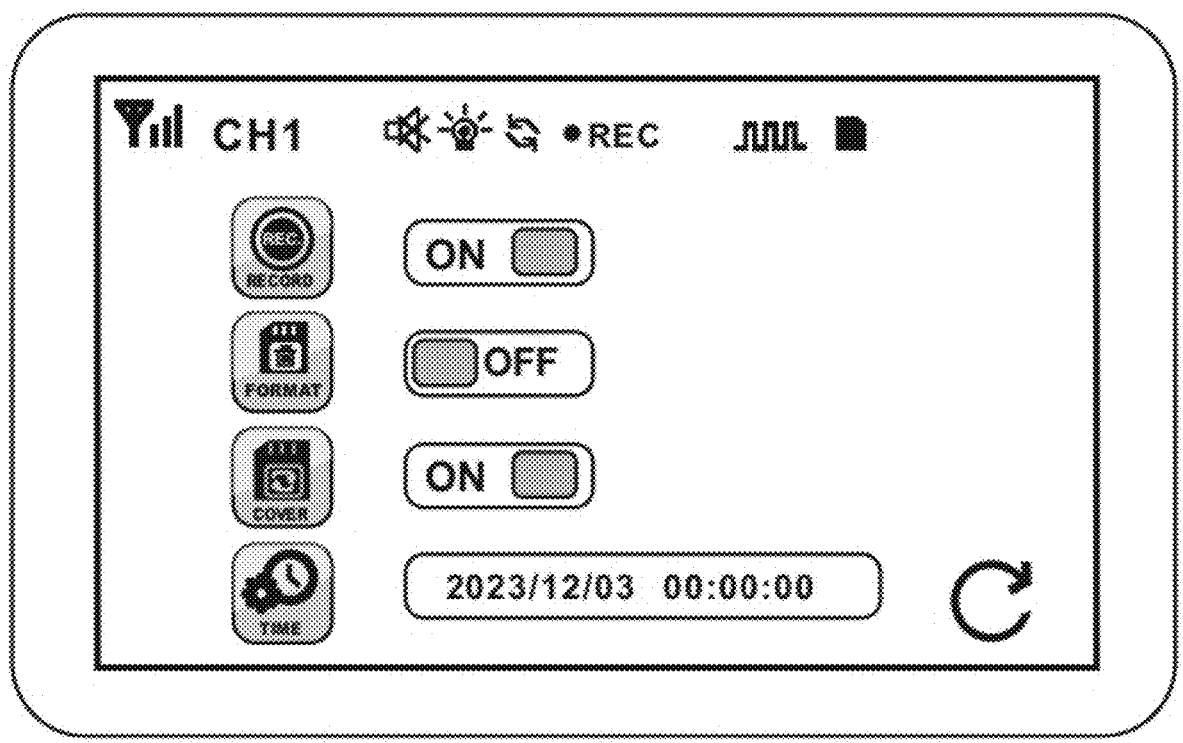
FIG. 21 is a schematic diagram of the display screen of the vehicle-mounted monitoring device entering a RECORD icon state.
Figure 22:
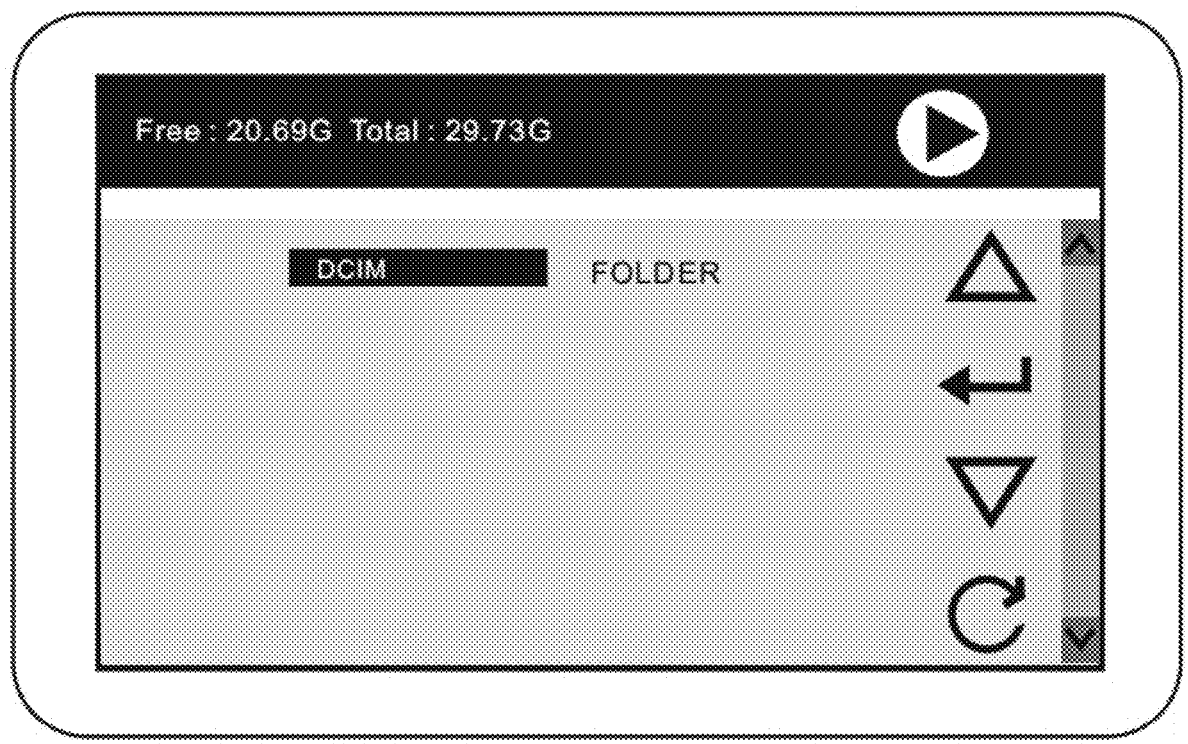
FIG. 22 is a schematic diagram of the display screen of the vehicle-mounted monitoring device entering a PLAY icon state.

Specifically, the sound settings are shown in FIG. 16; the PICTURE unit adjusts brightness, contrast, color of display screen 2, and a night light switch of camera 401, as shown in FIG. 17; the MIRROR unit is configured for flipping of the camera 401 images, as shown in FIG. 18; the SETTING icon sets the arrangement of images captured by multiple cameras 401 in the mode menu QMODE, as shown in FIG. 19; the SCAN icon switches the camera 401 channels, as shown in FIG. 20; the RECORD icon views the status of a TF card, storage status, video storage overwrite, and video storage time, as shown in FIG. 21; the PLAY icon sets video playback, as shown in FIG. 22.

Figure 11:
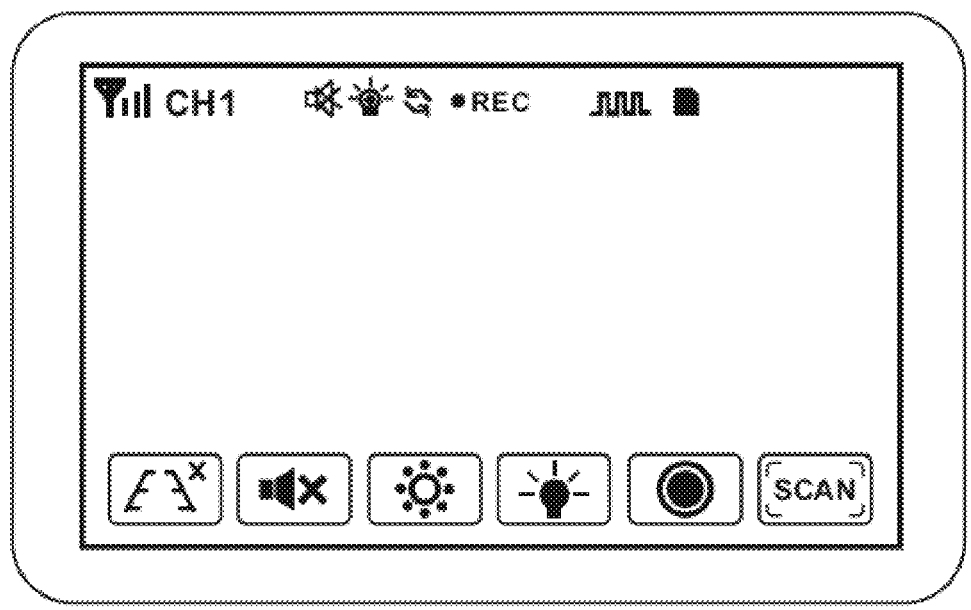
FIG. 11 is a schematic diagram of the display screen of the vehicle-mounted monitoring device in a second set of shortcut menu states.
Figure 23:
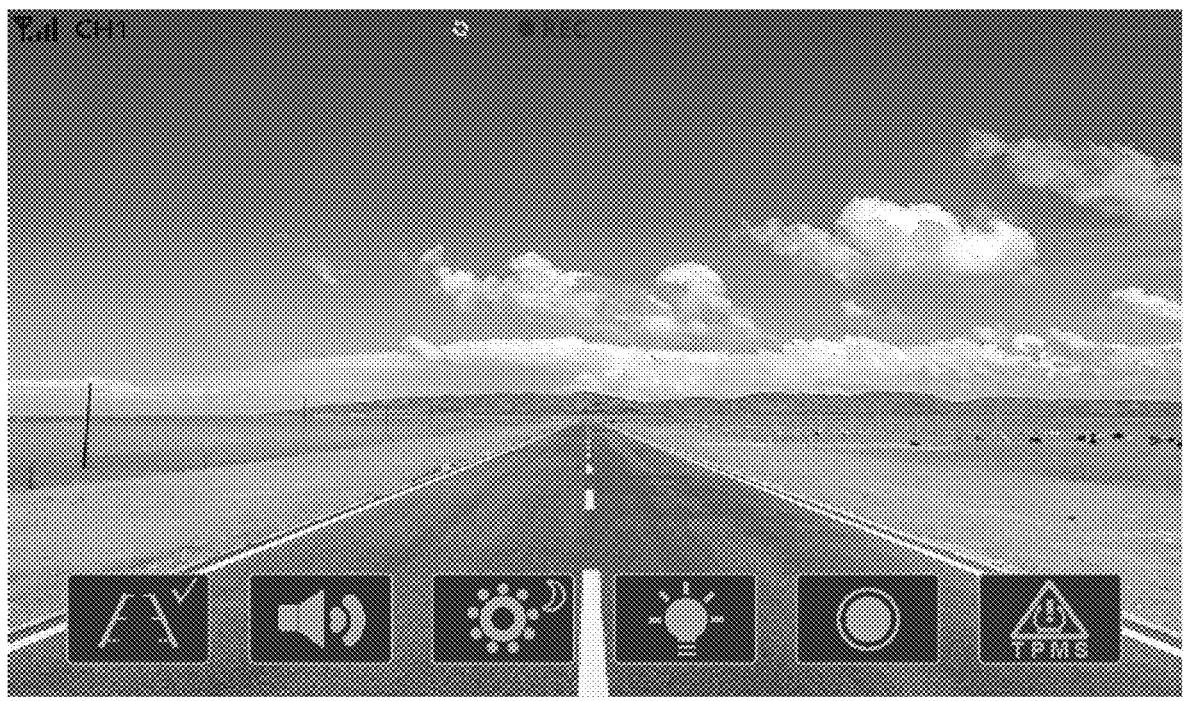
FIG. 23 is a schematic diagram of the display screen of the vehicle-mounted monitoring device in a second set of shortcut menu states.

When the user taps the display screen 2 again, the second group of shortcut menus pops up, as shown in FIG. 11 and FIG. 23, the second group of shortcut menus corresponds to the control of the camera 401 when taps the display screen 2. If the display screen 2 is on CH1, the second group of shortcut menus is the operation menu for CH1. Specifically, the second group of shortcut menus includes a parking line switch menu, a sound switch menu for camera 401, a brightness adjustment menu for display screen 2, a night light switch menu for camera 401, a recording switch menu for camera 401, and a SCAN menu or tire pressure monitoring menu TPMS for switching camera 401 channels.

In one embodiment, the touch display screen, when displaying the tire pressure alarm indication or the blowout image, additionally enables the user to exit from the interface through touch-based interactions, thereby enhancing user convenience.

Figure 7:
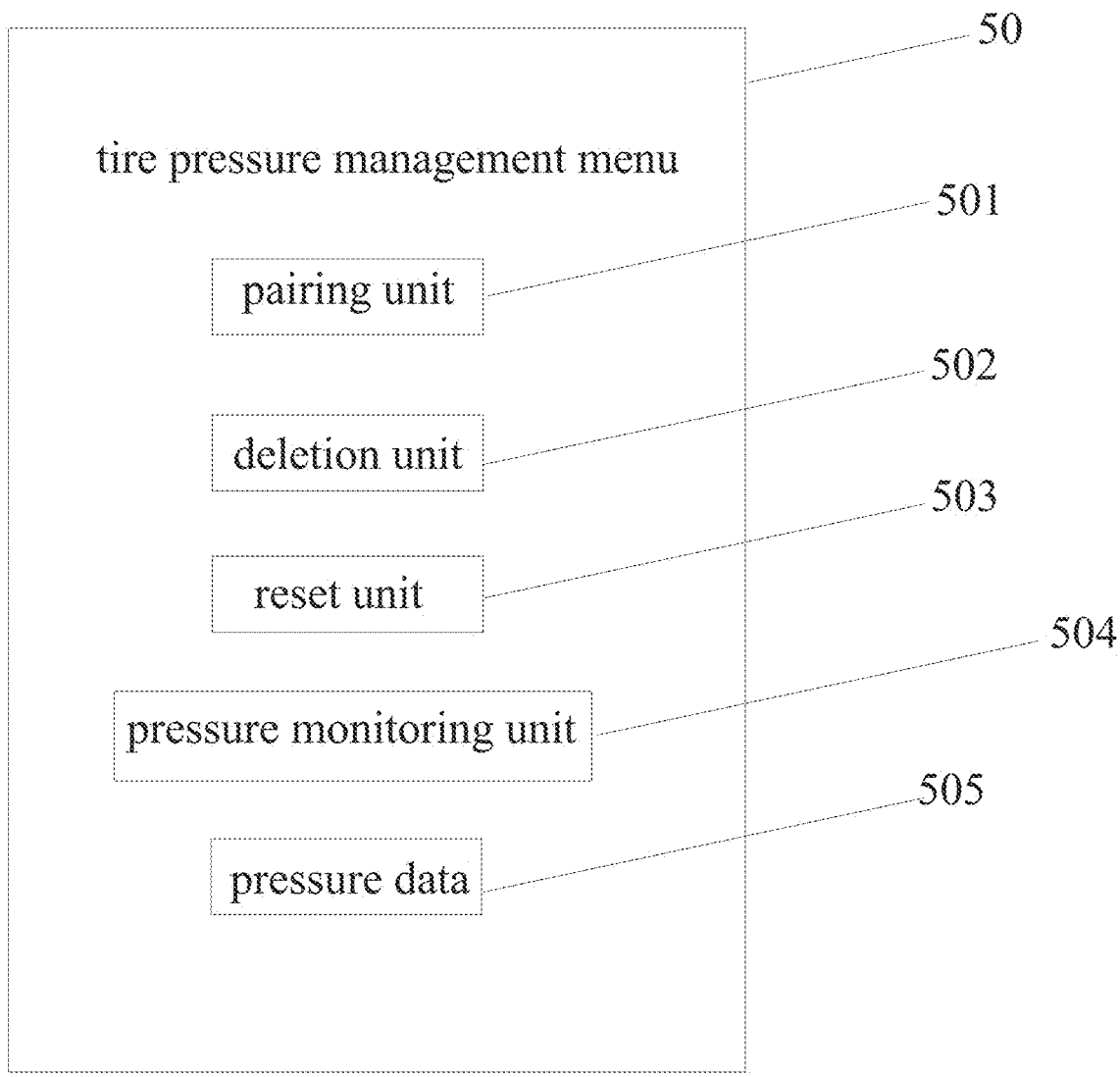
FIG. 7 is a module diagram of a tire pressure management menu in the vehicle-mounted monitoring system.
Figure 8:
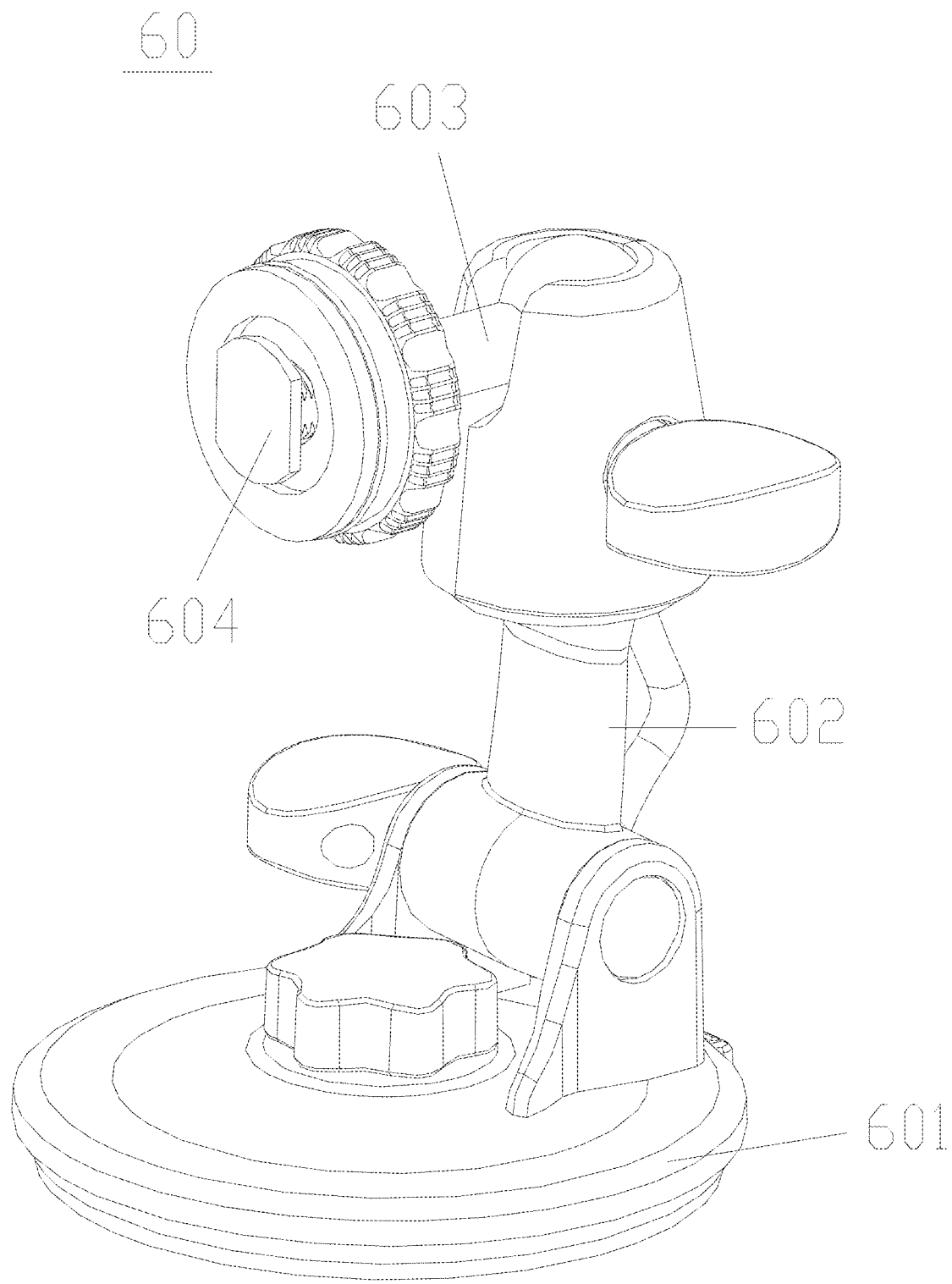
FIG. 8 is a schematic diagram of a vehicle mount of the present disclosure.

Referencing FIG. 7, in one embodiment, the tire pressure management menu also includes a pairing unit 501. After the user interacts with the pairing unit 501 on the touch screen, the circuit board 4 enters a state for pairing with the tire pressure sensor 402. During the process, once the tire pressure sensor 402 is installed on the tire valve and activated, the circuit board 4 is able to pair with the tire pressure sensor 402 through the second antenna 32 to complete the pairing process.

In one embodiment, the touch screen also provides an interface for entering the tire pressure sensor ID after the user interacts with the pairing unit 501. Once the user inputs the tire pressure sensor ID, the circuit board 4 pairs with the tire pressure sensor 402 through the second antenna 32.

In one embodiment, the tire pressure management menu further includes a deletion unit 502. After the user interacts with the deletion unit 502 on the touch screen, it clears paired tire pressure sensor ID from the circuit board 4, facilitating the management of tire pressure sensor IDs by the user.

In one embodiment, additionally, the tire pressure management menu includes a reset unit 503. After the user interacts with the reset unit 503 on the touch screen, it clears all tire pressure sensor IDs paired with the circuit board 4, making it convenient for users to remove all tire pressure sensors 402 paired with the circuit board 4.

Based on any of the above-mentioned embodiments of the vehicle-mounted monitoring device 10, this embodiment also provides a vehicle-mounted monitoring system.

Figure 6:
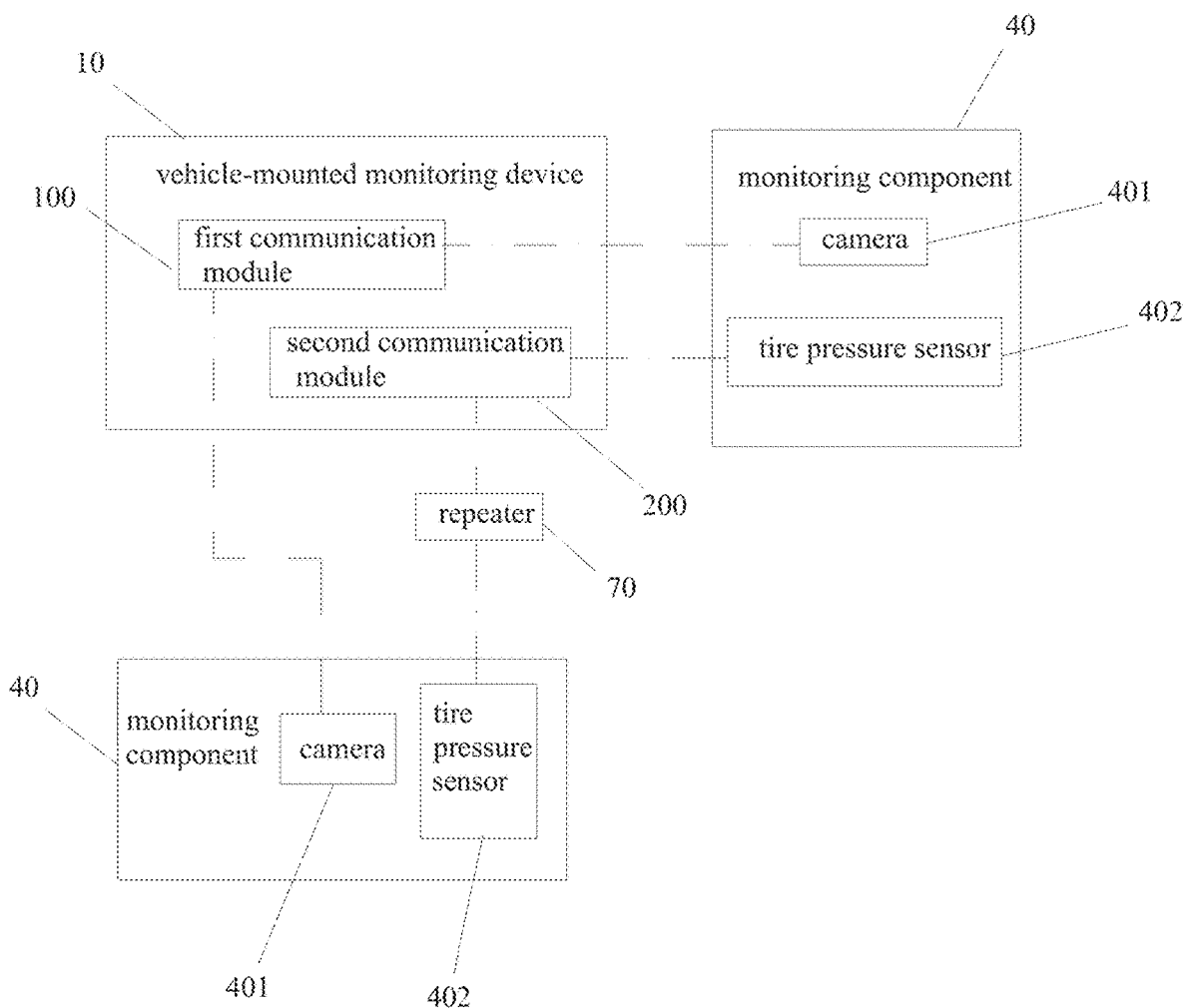
FIG. 6 is a principle block diagram of the vehicle-mounted monitoring system.

Referring to FIG. 6, the vehicle-mounted monitoring system includes at least one monitoring component 40 and the vehicle-mounted monitoring device 10 as disclosed above. Each monitoring component 40 is configured to in conjunction with a vehicle, and each monitoring component 40 includes the camera 401 wirelessly connected to the first communication module 100 for monitoring, and the tire pressure sensor 402 wirelessly connected to the second communication module 200 for collecting tire pressure data 505. The first communication module 100 receives image data wirelessly transmitted from the camera 401 and transmits the image data to the circuit board 4. The second communication module 200 receives tire pressure data 505 wirelessly transmitted from the tire pressure sensor 402 and transmits the tire pressure data 505 to the circuit board 4, the circuit board 4 then transmits both the image data and the tire pressure data 505 to the display screen 2 for display. Thus enabling the single vehicle-mounted monitoring device 10 to receive image signals from the camera 401 and tire pressure data 505 from the tire pressure sensor 402, obviating the necessity of monitoring multiple display screens and enhancing the driver's visibility and road safety.

Specifically, in one embodiment, the monitoring component 40 can be single, and one monitoring component 40 being suitable for use in a single vehicle.

In other embodiments, there may be multiple monitoring components 40, such as two, three, four, etc. When multiple monitoring components 40 are installed in a single vehicle or distributed across several trailers, this allows a single vehicle-mounted monitoring device 10 to be configured in conjunction with the monitoring components 40 on multiple vehicles. This is convenient for individuals owning multiple vehicles, as they can simply place the vehicle-mounted monitoring device 10 in the corresponding vehicle for use. Alternatively, it is suitable for a single vehicle head used with multiple trailers. By placing the vehicle-mounted monitoring device 10 in the vehicle head, tire pressure monitoring and video surveillance for multiple trailers can be achieved, broadening the range of applications and overcoming the limitation of using one vehicle-mounted monitoring device 10 with only a single monitoring component 40.

In one embodiment, the tire pressure management menu also includes multiple tire pressure monitoring units 504. Each tire pressure monitoring unit 504 corresponds to the tire pressure sensor 402 within a group of monitoring components 40. The touch display screen based on the user's touch interaction with the trailer tire pressure monitoring unit 504 displays the tire pressure data 505 from a tire pressure sensor 402 in the corresponding monitoring component 40, enabling the user to view the tire pressure data 505 of the corresponding vehicle or trailer by interacting with the respective tire pressure monitoring unit 504 on the touch display screen when using the specific vehicle.

Figure 25:
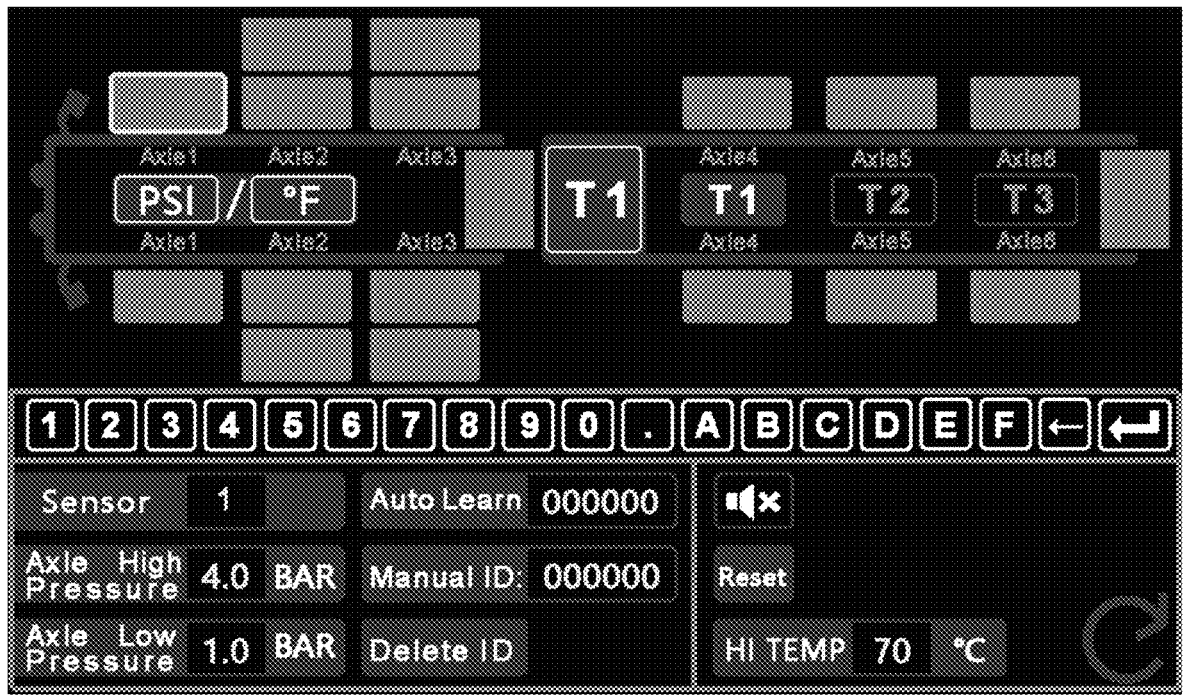
FIG. 25 is a schematic diagram of the display screen of the vehicle-mounted monitoring device in a tire pressure information setting interface.

Specifically, in practical application, when a user clicks on the tire pressure monitoring menu TPMS on the display screen 2, they enter the interface of the tire pressure management menu, as shown in FIG. 24. In FIG. 24, a gray and white box is configured to display the tire pressure values detected by the corresponding tire pressure sensor 402, as well as the tire pressure alarm values. T1, T2, and T3 in the FIG. 24 are tire pressure monitoring units 504. By selecting T1, T2, or T3, users can switch the tire pressure monitoring for different trailers. When a user clicks on the corresponding gray and white box, information about the tire pressure sensor 402, settings for the tire pressure alarm value, the pairing unit 501 for the tire pressure sensor 402, the deletion unit 502, and the reset unit 503, etc., will pop up below, as shown in FIG. 25.

In one embodiment, the vehicle-mounted monitoring system also includes a repeater 70. The repeater 70 is configured to transmit the received tire pressure data 505 to the vehicle-mounted monitoring device 10. When the vehicle is relatively long, and the tire pressure sensors 402 far from the vehicle-mounted monitoring device 10 have weak wireless transmission signals, the repeater 70 can be positioned in between. The repeater 70 receives the tire pressure data 505 and transmits the tire pressure data 505 to the vehicle-mounted monitoring device 10, allowing the vehicle-mounted monitoring system of this embodiment to be suitable for use in longer vehicles, achieving the transmission of tire pressure data 505 over longer distances.

Referring to FIG. 2 to FIG. 4 and FIG. 8, in one embodiment, the vehicle-mounted monitoring system also includes a vehicle mount 60. A bottom of the vehicle mount 60 is fixed to the vehicle's central control console via suction cups or adhesive. A back of the vehicle-mounted monitoring device 10 is provided with a slide groove 14, and the vehicle mount 60 is provided with a slider 604. The vehicle-mounted monitoring device 10 is secured to the vehicle mount 60 by placing the slider 604 into the slide groove 14. Thus, the vehicle-mounted monitoring device 10 can be fixed in positions such as the vehicle's central control console via the vehicle mount 60.

Specifically, a back of the rear shell 12 is provided with a first recess 121 with an open bottom and a second recess 122 located on both sides of the first recess 121. The main body 1 also includes a panel 13, the panel 13 is located on the second recess 122. The panel 13 is provided with an opening 131 with an open bottom at a position corresponding to the first recess 121, and width of the opening 131 is smaller than width of the first recess 121. The slide groove 14 is formed by the surrounding structure of the panel 13 and the first recess 121.

In one embodiment, the vehicle mount 60 includes a suction cup base 601, a first rotating rod 602 rotatably disposed on the suction cup base 601, and a second rotating rod 603 rotatably connected to the first rotating rod 602 via a universal ball head. The slider 604 is located at an end of the second rotating rod 603 far from the first rotating rod 602. The suction cup base 601 is a structure commonly found on existing vehicle-mounted phone holders and is a known technology. The suction cup base can be affixed to places like the vehicle's central control console using a suction cup. The first 602 and the second 603 rotating rods allow adjustment of height and angle of the vehicle-mounted monitoring device 10 for user convenience.

Figure 9:
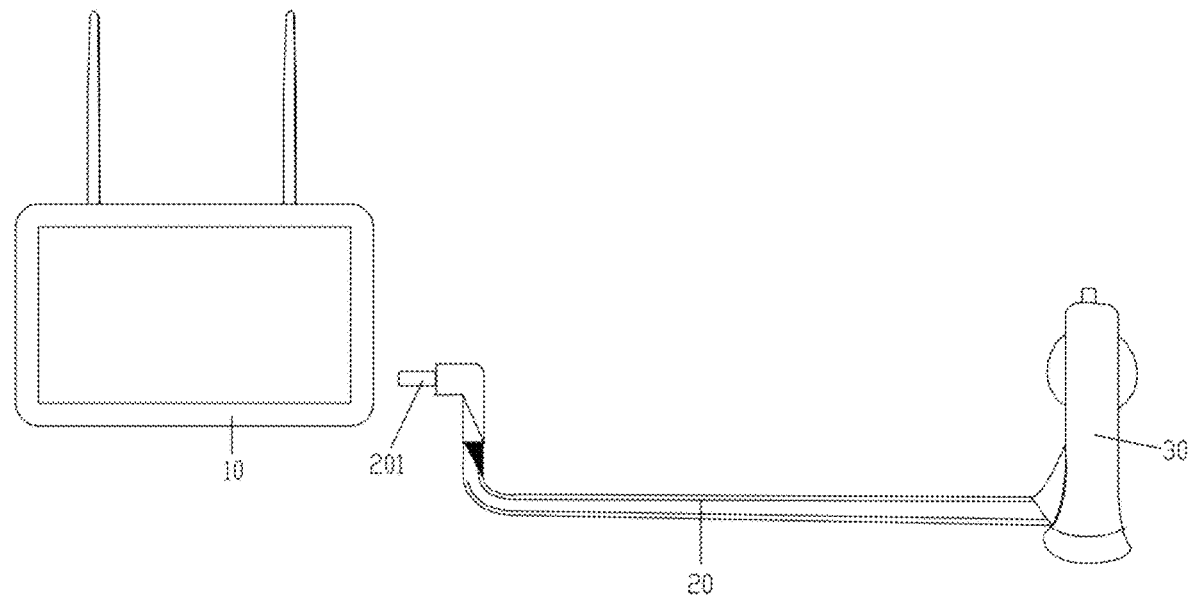
FIG. 9 is a breakdown diagram of the vehicle-mounted monitoring device and a first connection line.

In one embodiment, referring to FIG. 9, the vehicle-mounted monitoring system also includes a cigarette lighter 30 for use with a vehicle's cigarette lighter socket and a first connection cable 20 electrically connected to the cigarette lighter 30. The first connection cable 20 is provided with a male power plug 201 at an end far from the cigarette lighter 30. The main body 1 is provided with a female power plug 41 electrically connected to the circuit board 4 and configured to mate with the male power plug 201. The cigarette lighter 30 draws power from the vehicle's cigarette lighter socket and transmits the power to the circuit board 4 and the display screen 2 through the first connection cable 20, enabling the device to be powered from the vehicle. In another embodiment, the vehicle-mounted monitoring device 10 can also be powered through a USB interface power cable, etc.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present disclosure are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A vehicle-mounted monitoring device, comprising
a main body detachably arranged on a vehicle, and the main body arranged with a circuit board,
a display screen,
a first communication module and a second communication module, and
an alarm unit;
wherein the display screen, the first communication module and the second communication module are all electrically connected to the circuit board;
the first communication module is configured to receive image data wirelessly transmitted from at least one camera and then transmit the image data to the circuit board,
the second communication module is configured to receive tire pressure data wirelessly transmitted from at least one tire pressure sensor and then transmit the tire pressure data to the circuit board,
the circuit board transmits both the image data and tire pressure data to the display screen for display,
wherein the vehicle-mounted monitoring device further comprises an alarm unit arranged in the main body and electrically connected to the circuit board, the circuit board driving the alarm unit to alert when the tire pressure data is abnormal,
wherein the circuit board is configured to drive the alarm unit to emit a tire blowout sound and drives the display screen to show a blowout image or a blowout indicator when the tire pressure changes from a normal pressure value to below a first preset value within a preset time period, the blowout image is either the real-time image of the tire captured by the camera or a virtual dynamic image of the blowout.

2. The vehicle-mounted monitoring device according to claim 1, wherein the first communication module is a 2.4G module and the second communication module is a 433m wireless module.

3. The vehicle-mounted monitoring device according to claim 1, wherein the first communication module comprises a first antenna electrically connected to the circuit board, and the first antenna is disposed on a top of the main body; the second communication module comprises a second antenna electrically connected to the circuit board, the second antenna being either an FPC antenna or a spring antenna.

4. The vehicle-mounted monitoring device according to claim 3, wherein when the second antenna is the FPC antenna, at least part of the second antenna is adhered to a top or near a top of an inner side wall of the main body.

5. The vehicle-mounted monitoring device according to claim 1, wherein the tire pressure data comprises one or more of the following: tire pressure, tire temperature, and battery power information of the tire pressure sensor.

6. The vehicle-mounted monitoring device according to claim 1, wherein the circuit board drives the display screen to show an alarm indication when the tire pressure data is abnormal, the abnormality in the tire pressure data being one or more of the following: tire pressure higher than a second preset value, tire temperature higher than a preset temperature, tire pressure lower than a third preset value.

7. The vehicle-mounted monitoring device according to claim 6, wherein a tire pressure alarm indication comprises one or more of the following: a tire pressure alarm icon, a real-time tire imagery, and an abnormal tire virtual imagery, the real-time tire imagery is the real-time image of the abnormal tire captured by the camera, and the abnormal tire virtual imagery comprises virtual image data pre-stored in the circuit board; the virtual image data comprises dynamic imagery data for excessively high tire pressure, excessively low tire pressure, and tire turning red, or a combination thereof.

8. The vehicle-mounted monitoring device according to claim 1, wherein the circuit board drives the display screen to show a reminder indication when a battery power transmitted by the tire pressure sensor is below a preset power level.

9. The vehicle-mounted monitoring device according to claim 1, wherein the alarm unit is a horn.

10. A vehicle-mounted monitoring device, comprising
a main body detachably arranged on a vehicle, and the main body arranged with a circuit board,
a display screen,
a first communication module and a second communication module,
wherein the display screen, the first communication module and the second communication module are all electrically connected to the circuit board;
the first communication module is configured to receive image data wirelessly transmitted from at least one camera and then transmit the image data to the circuit board,
the second communication module is configured to receive tire pressure data wirelessly transmitted from at least one tire pressure sensor and then transmit the tire pressure data to the circuit board, and
the circuit board transmits both the image data and tire pressure data to the display screen for display;
wherein the display screen is a touch screen, the touch screen is configured to respond to user's touch commands for a target task to display a control result of the target task, the control results comprises one of a tire pressure management menu, switching images captured by multiple cameras, switching preset data of multiple tire pressure sensors, or adjusting tire pressure anomaly alarm values, and the tire pressure anomaly alarm values comprise a high-pressure alarm value and a low-pressure alarm value, and the tire pressure management menu at least comprises tire pressure data,
wherein the tire pressure management menu further comprises a pairing unit; the touch screen pairs with a tire pressure sensor set on a tire valve based on user touch control of the pairing unit, thereby enabling the circuit board to pair with the tire pressure sensor through the second antenna.

11. The vehicle-mounted monitoring device according to claim 10, wherein the touch screen also achieves pairing between the circuit board and the tire pressure sensor through the second antenna after the user touches the pairing unit and inputs a tire pressure sensor ID.

12. The vehicle-mounted monitoring device according to claim 10, wherein the tire pressure management menu also comprises a deletion unit, the touch screen clears a paired tire pressure sensor ID with the circuit board after the user touches the deletion unit; the tire pressure management menu also comprises a reset unit, the touch screen clears all tire pressure sensor IDs paired with the circuit board after the user touches the reset unit.

13. A vehicle-mounted monitoring system, comprising:
a main body detachably arranged on a vehicle, and the main body arranged with a circuit board,
a display screen,
a first communication module and a second communication module,
wherein the display screen, the first communication module and the second communication module are all electrically connected to the circuit board;
the first communication module is configured to receive image data wirelessly transmitted from at least one camera and then transmit the image data to the circuit board;
the second communication module is configured to receive tire pressure data wirelessly transmitted from at least one tire pressure sensor and then transmit the tire pressure data to the circuit board;
the circuit board transmits both the image data and tire pressure data to the display screen for display;
each monitoring component comprises: the camera wirelessly connected to the first communication module and configured for monitoring; and
the tire pressure sensor wirelessly connected to the second communication module and configured for collecting tire pressure data,
wherein the vehicle-mounted monitoring system further comprises an alarm unit arranged in the main body and electrically connected to the circuit board, the circuit board driving the alarm unit to alert when the tire pressure data is abnormal,
wherein the circuit board is configured to drive the alarm unit to emit a tire blowout sound and drives the display screen to show a blowout image or a blowout indicator when the tire pressure changes from a normal pressure value to below a preset value within a preset time period, the blowout image is either the real-time image of the tire captured by the camera or a virtual dynamic image of the blowout.

14. The vehicle-mounted monitoring system according to claim 13, wherein the display screen is a touch screen display and configured to provide a tire pressure management menu, the tire pressure management menu further comprises a plurality of tire pressure monitoring units, each tire pressure monitoring unit corresponding to the tire pressure sensor in a set of monitoring components, the touch screen displays tire pressure data of the corresponding monitoring component after the user touches the tire pressure monitoring unit.

15. The vehicle-mounted monitoring system according to claim 13, further comprising a repeater configured to transmit the received tire pressure data to the vehicle-mounted monitoring device.

16. The vehicle-mounted monitoring system according to claim 13, further comprising a vehicle mount, wherein a bottom of the vehicle mount is fixed on a vehicle's central control console by a suction cup or adhesive; a back of the vehicle-mounted monitoring device is provided with a groove, the vehicle mount is provided with a slider, and the vehicle-mounted monitoring device is fixed on the vehicle mount through the slider placed in the groove.

17. The vehicle-mounted monitoring system according to claim 16, wherein the vehicle mount comprises a suction cup base, a first rotating rod rotatably arranged on the suction cup base, and a second rotating rod rotatably connected to the first rotating rod through a universal ball joint, the slider is arranged at an end of the second rotating rod far from the first rotating rod.

18. The vehicle-mounted monitoring system according to claim 13, further comprising a cigarette lighter configured to adapt to a vehicle's cigarette lighter socket and a first connection cable electrically connected to the cigarette lighter, wherein the first connection cable is provided with a male power plug at an end far from the cigarette lighter, the main body is provided with a female power plug electrically connected to the circuit board and configured to mate with the male power plug, the cigarette lighter draws power from the vehicle's cigarette lighter socket and transmits the power to the circuit board and display screen through the first connection cable.

* * * * *